United States Patent
Norieda et al.

(10) Patent No.: US 10,168,769 B2
(45) Date of Patent: Jan. 1, 2019

(54) INPUT APPARATUS, INPUT METHOD, AND PROGRAM

(71) Applicant: NEC Corporation, Minato-ku, Tokyo (JP)

(72) Inventors: Shin Norieda, Tokyo (JP); Makoto Yoshimoto, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/759,997

(22) PCT Filed: Sep. 20, 2016

(86) PCT No.: PCT/JP2016/077729
§ 371 (c)(1),
(2) Date: Mar. 14, 2018

(87) PCT Pub. No.: WO2017/057106
PCT Pub. Date: Apr. 6, 2017

(65) Prior Publication Data
US 2018/0260033 A1  Sep. 13, 2018

(30) Foreign Application Priority Data
Sep. 28, 2015 (JP) .................... 2015-190238

(51) Int. Cl.
G06F 3/01    (2006.01)
G06T 7/246   (2017.01)
G06K 9/00    (2006.01)

(52) U.S. Cl.
CPC .......... G06F 3/011 (2013.01); G06F 3/017 (2013.01); G06K 9/00355 (2013.01);
(Continued)

(58) Field of Classification Search
CPC .................. G06F 3/011; G06F 3/017
See application file for complete search history.

(56) References Cited

U.S. PATENT DOCUMENTS 6,345,111 B1    2/2002  Yamaguchi et al.
6,771,294 B1 *  8/2004  Pulli ............... G06F 3/011
                                               345/173
(Continued)

FOREIGN PATENT DOCUMENTS

JP    2004-192653 A    7/2004
JP    2008-067219 A    3/2008
(Continued)

OTHER PUBLICATIONS

International Search Report for PCT Application No. PCT/JP2016/077729, dated Nov. 22, 2016.
(Continued)

*Primary Examiner* — Patrick F Marinelli

(57) ABSTRACT

An input apparatus (2000) includes a motion detection unit (2020) and an input recognition unit (2040). The motion detection unit (2020) detects motion of an object by using a captured image including the object. Here, the detected motion of the object is motion of the object in a period defined based on a result of detection by a sensor attached to the body of a user of the input apparatus (2000). The input recognition unit (2040) recognizes input to an information processing apparatus based on the detected motion of the object.

10 Claims, 31 Drawing Sheets

(52) U.S. Cl.
CPC .... *G06T 7/248* (2017.01); *G06T 2207/30196* (2013.01); *G06T 2207/30204* (2013.01)

(56) References Cited

U.S. PATENT DOCUMENTS

| | | | | |
|---|---|---|---|---|
| 8,471,868 | B1* | 6/2013 | Wilson | G06F 3/017 |
| | | | | 345/156 |
| 8,743,079 | B2* | 6/2014 | Norieda | G06F 1/163 |
| | | | | 345/156 |
| 9,069,164 | B2* | 6/2015 | Starner | G02B 27/017 |
| 9,195,303 | B2* | 11/2015 | Norieda | G04G 21/04 |
| 9,377,850 | B2* | 6/2016 | Norieda | G06F 3/011 |
| 9,727,131 | B2* | 8/2017 | Lim | G06F 3/011 |
| 9,817,628 | B2* | 11/2017 | Sugiyama | G06F 3/1454 |
| 9,829,986 | B2* | 11/2017 | Yun | G02B 27/0172 |
| 9,857,971 | B2* | 1/2018 | Chang | G06F 3/0426 |
| 9,922,462 | B2* | 3/2018 | Miller | G06F 3/011 |
| 9,958,902 | B2* | 5/2018 | Norieda | G06F 1/163 |
| 9,971,408 | B2* | 5/2018 | Gustin | G06F 3/016 |
| 2004/0070563 | A1* | 4/2004 | Robinson | H04N 9/3129 |
| | | | | 345/156 |
| 2006/0007056 | A1* | 1/2006 | Ou | G02B 27/017 |
| | | | | 345/8 |
| 2008/0062291 | A1 | 3/2008 | Sako et al. | |
| 2010/0199232 | A1* | 8/2010 | Mistry | G06F 1/163 |
| | | | | 715/863 |
| 2011/0050720 | A1 | 3/2011 | Carter et al. | |
| 2012/0326833 | A1 | 12/2012 | Aichi et al. | |
| 2013/0002544 | A1* | 1/2013 | Norieda | G04G 21/04 |
| | | | | 345/156 |
| 2013/0009870 | A1* | 1/2013 | Norieda | G06F 3/011 |
| | | | | 345/156 |
| 2013/0013229 | A1* | 1/2013 | Norieda | G06F 3/011 |
| | | | | 702/56 |
| 2013/0016070 | A1* | 1/2013 | Starner | G02B 27/017 |
| | | | | 345/175 |
| 2015/0016777 | A1 | 1/2015 | Abovitz et al. | |
| 2015/0199167 | A1* | 7/2015 | Sugiyama | G06F 3/1454 |
| | | | | 345/2.3 |
| 2017/0212593 | A1* | 7/2017 | Gustin | G06F 3/016 |
| 2017/0255838 | A1* | 9/2017 | Norieda | G06K 9/4671 |
| 2017/0344124 | A1* | 11/2017 | Douxchamps | G06F 3/017 |
| 2018/0032146 | A1* | 2/2018 | Yun | G02B 27/0172 |
| 2018/0150186 | A1* | 5/2018 | Norieda | H03M 11/04 |

FOREIGN PATENT DOCUMENTS

| | | |
|---|---|---|
| JP | 2011-054162 A | 3/2011 |
| JP | 2011-257943 A | 12/2011 |
| JP | 2012-079138 A | 4/2012 |
| JP | 2013-008314 A | 1/2013 |
| JP | 2013-041431 A | 2/2013 |
| JP | 2013-114467 A | 6/2013 |
| JP | 2013-186646 A | 9/2013 |
| JP | 2014-032646 A | 2/2014 |
| JP | 2015-504616 A | 2/2015 |
| JP | 2015-135563 A | 7/2015 |
| JP | 2015-162056 A | 9/2015 |
| WO | 2011/115035 A1 | 9/2011 |

OTHER PUBLICATIONS

International Preliminary Report on Patentability for PCT Application No. PCT/JP2016/077729, dated Dec. 22, 2017.

* cited by examiner

FIG. 9
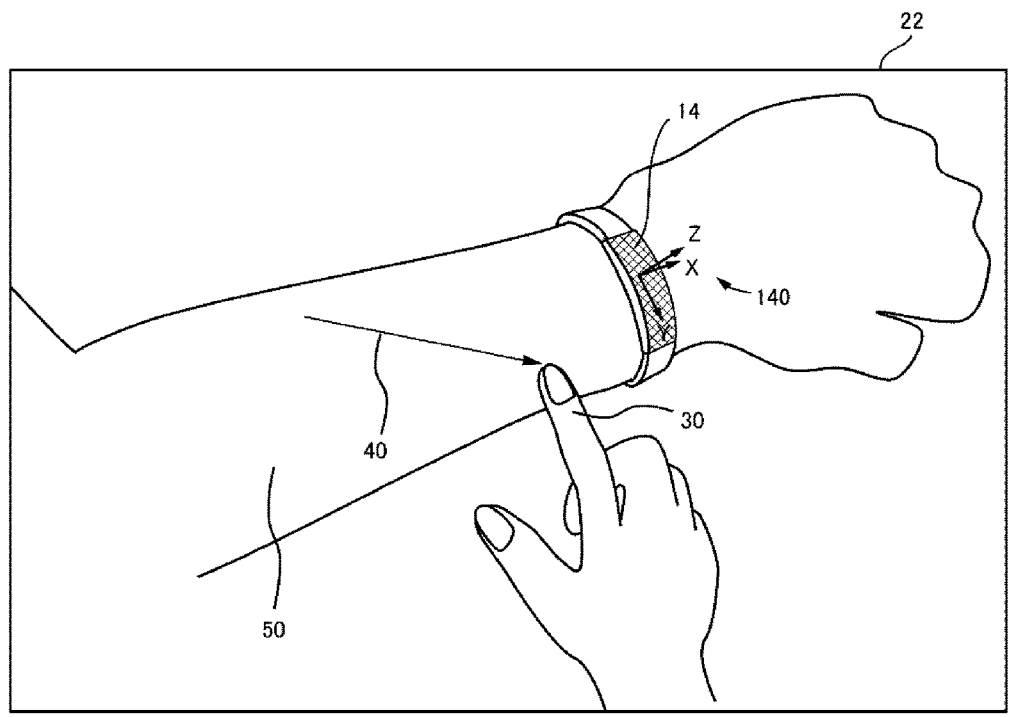
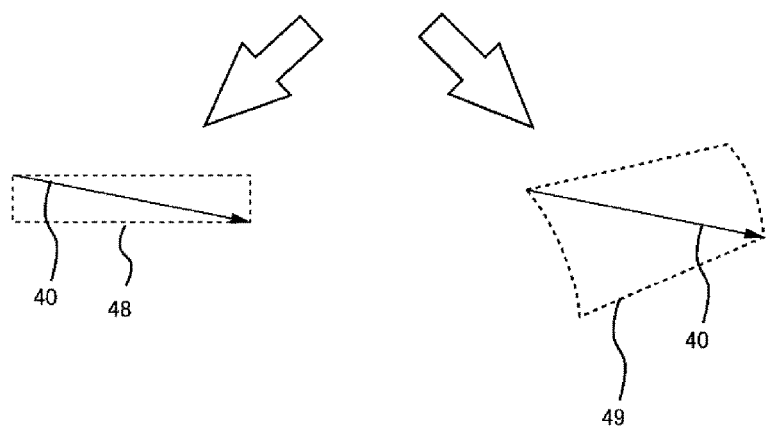

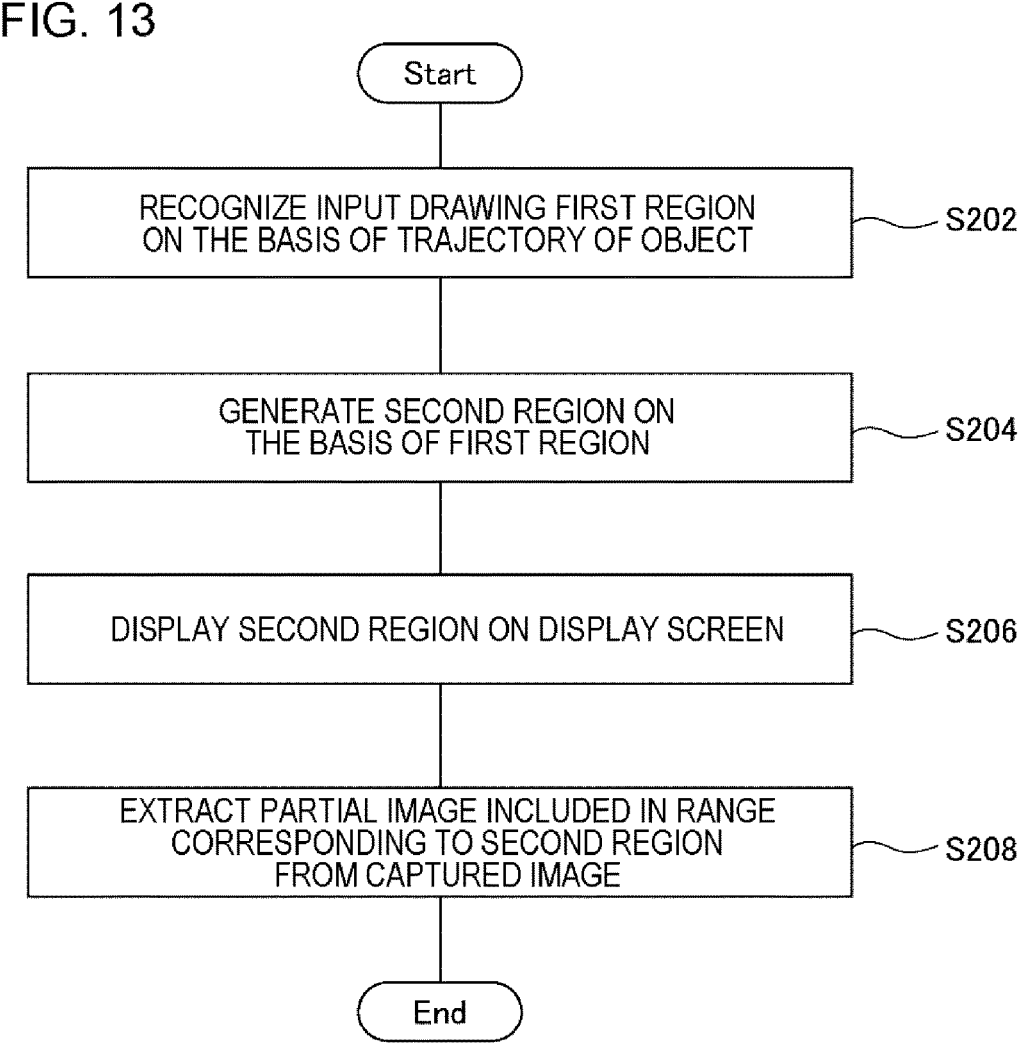

FIG. 18
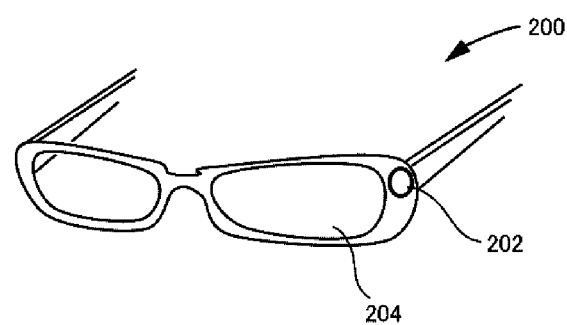
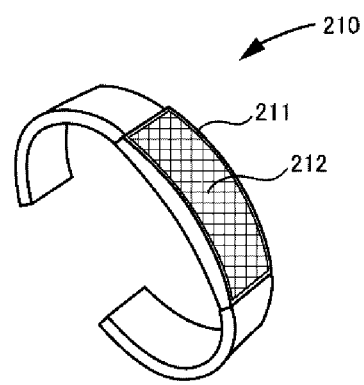

INPUT APPARATUS, INPUT METHOD, AND PROGRAM

This application is a National Stage Entry of PCT/JP2016/077729 filed on Sep. 20, 2016, which claims priority from Japanese Patent Application 2015-190238 filed on Sep.28, 2015, the contents of all of which are incorporated herein by reference, in their entirety.

TECHNICAL FIELD

The present invention relates to an input apparatus, an input method, and a program.

BACKGROUND ART

A technique has been developed in which an action such as a gesture input performed on a space by a user is imaged by a camera, a generated captured image is analyzed, and thus the user's input operation on an information processing apparatus is recognized. Patent Document 1 discloses a technique in which a menu screen is displayed on the palm or the menu screen is changed according to a gesture of the palm of a user (for example, a gesture of opening the palm).

Patent Document 2 discloses a technique of performing input by using a virtual keyboard displayed on a head mounted display. Patent Document 2 discloses a technique in which the virtual keyboard is fixed to an object on a real space, and thus a position of the virtual keyboard is not changed even if the head of a person wearing the head mounted display is moved.

RELATED DOCUMENT

Patent Document

[Patent Document 1] U.S. Patent Application Publication No. 2015/0016777

[Patent Document 2] PCT Japanese Translation Patent Publication No. 2015-504616

SUMMARY OF THE INVENTION

Technical Problem

In a case of analyzing motion of the hand of a user included in a captured image, it is hard to differentiate a case where the user is moving the hand for an input operation from a case where the user is moving the hand for another purpose. Thus, there is a probability that an input operation may be wrongly recognized despite the user not performing the input operation, or an input operation may not be recognized despite the user performing the input operation.

The present invention has been made in light of the problem. An object of the present invention is to provide a technique of improving the recognition accuracy when a user's input operation is recognized from a captured image.

SOLUTION TO PROBLEM

According to the present invention, there is provided an input apparatus including 1) a motion detection unit detecting motion of an object in a period defined based on a result of detection by a sensor attached to the body of a user, by using a captured image including the object; and 2) an input recognition unit that recognizing input to an information processing apparatus based on the detected motion of the object.

According to the present invention, there is provided an input method executed by a computer.

The input method includes 1) a motion detection step of detecting motion of an object in a period defined based on a result of detection by a sensor attached to the body of a user, by using a captured image including the object; and 2) an input recognition step of recognizing input to an information processing apparatus based on the detected motion of the object.

Advantageous Effects Of Invention

According to the present invention, there is provided a technique of improving the recognition accuracy when a user's input operation is recognized from a captured image.

BRIEF DESCRIPTION OF THE DRAWINGS

The above-described object, and other objects, features and advantages will become more apparent based on preferred embodiments described below and the following accompanying drawings.

FIG. 9 is a diagram illustrating a scene in which motion of an object is converted into a shape.

FIG. 13 is a flowchart illustrating a flow of a process performed by the input apparatus of Example Embodiment 2.

FIG. 18 is a diagram illustrating glasses and a watch.

DESCRIPTION OF EMBODIMENTS

Figure 1:
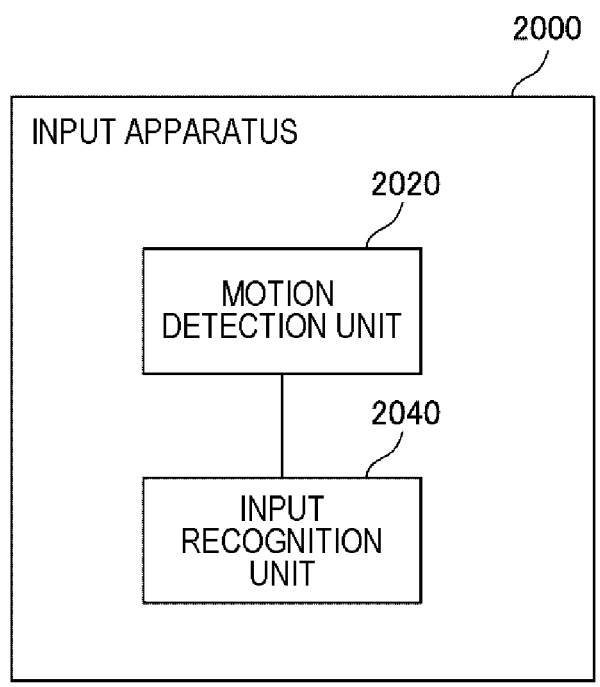
FIG. 1 is a block diagram illustrating an input apparatus according to Example Embodiment 1.

Hereinafter, example embodiments of the present invention will be described with reference to the drawings. The same constituent elements are given the same reference numerals throughout all the drawings, and description thereof will not be repeated as appropriate.

[Example Embodiment 1]

FIG. 1 is a block diagram illustrating an input apparatus 2000 according to Example Embodiment 1. In FIG. 1, each block indicates not a configuration in the hardware unit but a configuration in the functional unit.

The input apparatus 2000 includes a motion detection unit 2020 and an input recognition unit 2040. The motion detection unit 2020 detects motion of an object by using a captured image including the object. Here, the detected motion of the object is motion of the object in a period defined based on a result of detection by a sensor attached to a body of a user of the input apparatus 2000. The input recognition unit 2040 recognizes input to an information processing apparatus based on the detected motion of the object. An information processing apparatus operated through this input (an information processing apparatus which is an input target) may be the input apparatus 2000, or may be other apparatuses.

Figure 2:
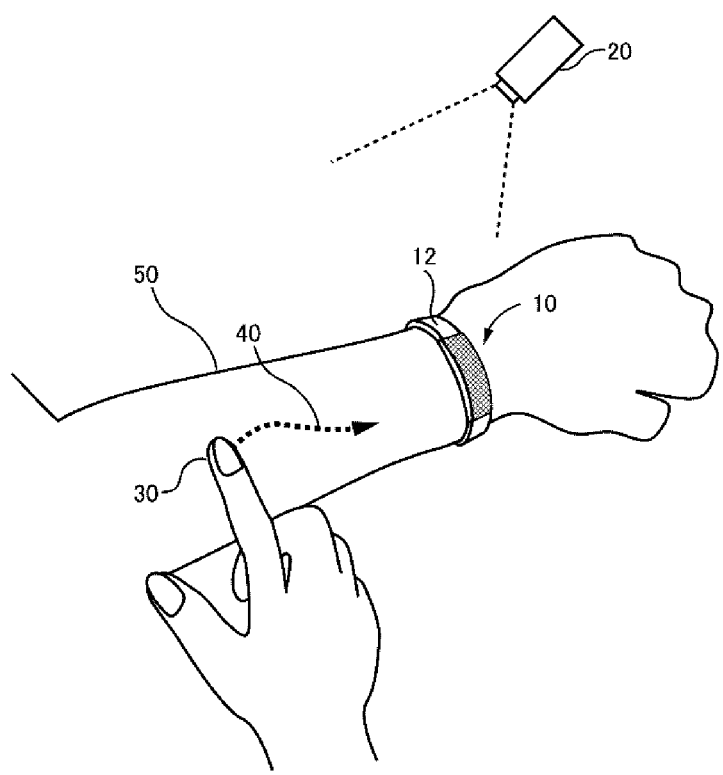
FIG. 2 is a diagram for conceptually explaining an operation of the input apparatus.

FIG. 2 is a diagram for conceptually explaining an operation of the input apparatus 2000. A user performs input to the information processing apparatus by moving the finger 30. The motion of the finger 30 is imaged by a camera 20. As a result, the camera 20 generates a captured image including the finger 30. The input apparatus 2000 detects motion of the finger 30 based on the finger 30 included in the captured image generated by the camera 20. The input apparatus 2000 recognizes the user's input based on the detected motion of the finger 30.

The input apparatus 2000 uses a sensor attached to the user for recognition of an input operation performed by the user. In FIG. 2, a sensor 12 is built into a device 10 mounted on the left arm 50 of the user. The sensor 12 is, for example, a vibration sensor. For example, if the user taps the left arm 50 at a timing of starting an input operation, the input apparatus 2000 can recognize that the user's action including this timing is an input operation based on this timing at which the tapping is detected by the sensor. Therefore, the input apparatus 2000 detects motion of the finger 30 in a period including this timing, and can thus accurately recognize an input operation intended by the user.

However, an operation of the input apparatus 2000 described with reference to FIG. 2 is an example for better understanding of the input apparatus 2000, and an operation of the input apparatus 2000 is not limited to the above-described example. Details and variations of an operation of the input apparatus 2000 will be described later.

<Advantageous Effects>

If a user's input operation is to be recognized by using only motion of an object included in a captured image, it is hard to differentiate a case where the user is moving the object for an input operation from a case where the user is moving the object for another purpose. Thus, there is a probability that an input operation may be wrongly recognized despite the user not performing the input operation, or an input operation may not be recognized despite the user performing the input operation.

Therefore, the input apparatus 2000 of the present example embodiment recognizes an input operation by analyzing motion of an object in a period defined based on a result of detection by the sensor attached to the user. There is a high probability that the motion of the object in this period may be motion indicating an input operation. Thus, an input operation intended by the user can be accurately recognized, and thus it is possible to prevent an input operation from being wrongly recognized despite the user not performing the input operation, or an input operation from not being recognized despite the user performing the input operation.

<Example of Hardware Configuration of Input Apparatus 2000>

Each functional configuration unit of the input apparatus 2000 may be realized by hardware (for example, a hardware electronic circuit), or may be realized by a combination of hardware and software (for example, a combination of an electronic circuit and a program for controlling the electronic circuit). Hereinafter, a further description will be made of a case where each functional configuration unit of the input apparatus 2000 is realized by a combination of hardware and software.

A computer 1000 is various computers such as a head mounted display, a tablet terminal, a smart phone, a personal computer (PC), or a server machine. The computer 1000 may be a special purpose computer designed to realize the input apparatus 2000, or may be a general purpose computer.

Figure 3:
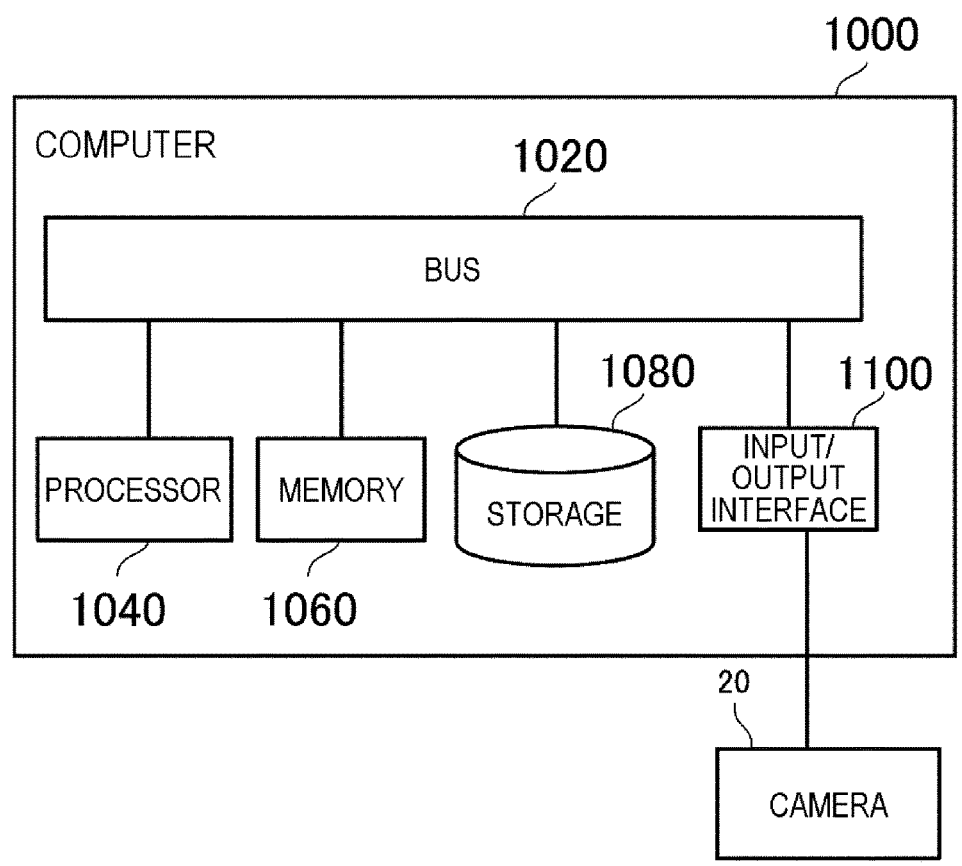
FIG. 3 is a diagram illustrating a configuration of a computer realizing the input apparatus.

FIG. 3 is a diagram illustrating a configuration of the computer 1000 realizing the input apparatus 2000. The computer 1000 includes a bus 1020, a processor 1040, a memory 1060, a storage 1080, and an input/output interface 1100. The bus 1020 is a transmission path for transmitting and receiving data among the processor 1040, the memory 1060, and the storage 1080. However, a method of connecting the processor 1040 and the like to each other is not limited to connection using a bus. The processor 1040 is, for example, a processor such as a central processing unit (CPU) or a graphics processing unit (GPU). The memory 1060 is, for example, a random access memory (RAM) or a read only memory (ROM). The storage 1080 is, for example, a storage device such as a hard disk, a solid state drive (SSD), or a memory card. The storage 1080 may be a memory such as a RAM or a ROM.

The input/output interface 1100 connects the computer 1000 to input and output devices. The input/output interface 1100 is connected to the camera 20. The camera 20 is any camera repeatedly performing imaging, and generates a captured image indicating each imaging result. Note that the camera 20 may be a two-dimensional (2D) camera, or may be a three-dimensional (3D) camera.

The camera 20 is provided at any location. For example, the camera 20 is attached to an object attached to the user. The object attached to the user is, for example, a head mounted display or an employee ID card held from the neck of the user. For example, the camera 20 may be provided on a wall of a room in which the user performs an input operation on the input apparatus 2000. In the latter case, it is preferable that an imaging range (an imaging direction or a zoom ratio) of the camera 20 can be changed through remote control using a remote controller.

The storage 1080 stores a program module for realizing each functional configuration unit. The processor 1040 realizes a function of each functional configuration unit of the input apparatus 2000 by executing each program module. Here, when each module is executed, the processor 1040 may execute the module after reading the module to the memory 1060, or may execute the module without reading the module to the memory 1060.

A hardware configuration of the computer 1000 is not limited to the configuration illustrated in FIG. 3. For example, each program module may be stored in the memory 1060. In this case, the computer 1000 may not include the storage 1080.

<Flow of Process>

Figure 4:
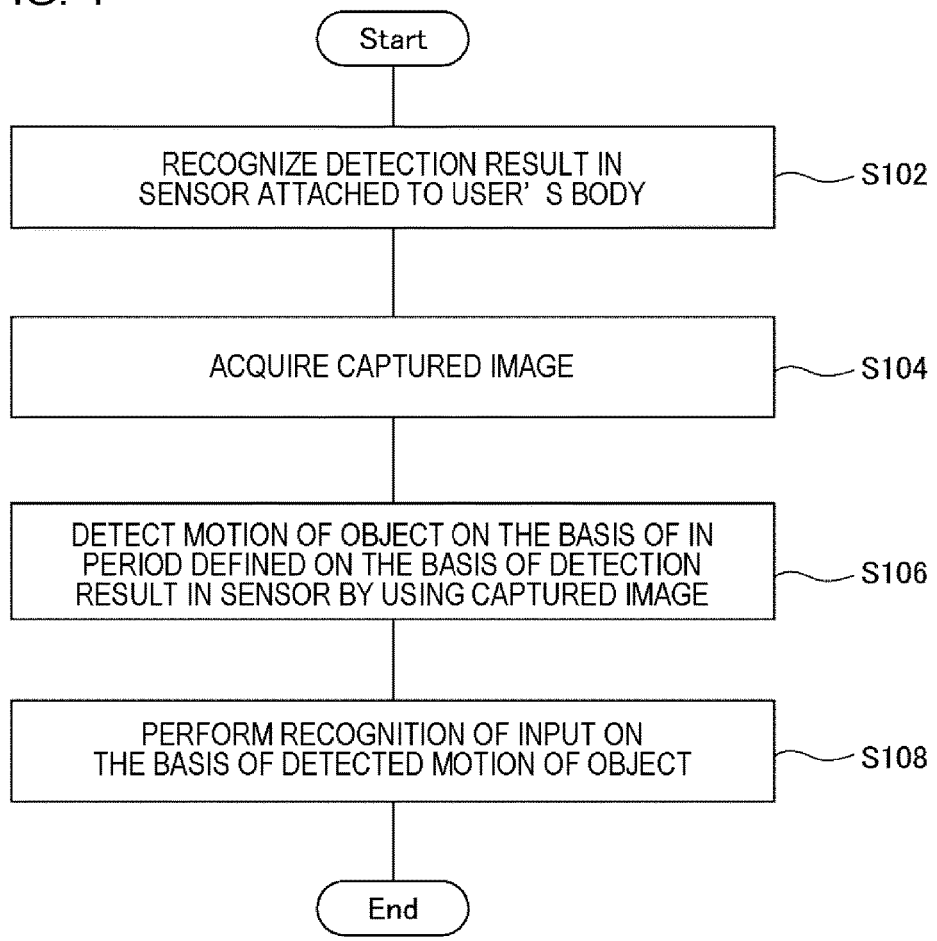
FIG. 4 is a flowchart illustrating a flow of a process performed by the input apparatus of Example Embodiment 1.

FIG. 4 is a flowchart illustrating a flow of a process performed by the input apparatus 2000 of Example Embodiment 1. The motion detection unit 2020 recognizes a result of detection by the sensor 12 attached to the body of the user of the input apparatus 2000 (S102). The motion detection unit 2020 acquires a captured image (S104). The motion detection unit 2020 detects motion of an object in a period defined based on the result of detection by the sensor 12 by using the acquired captured image (S106). The input recognition unit 2040 recognizes input to the information processing apparatus based on the detected motion of the object (S108).

<Sensor Attached to User>

A sensor attached to the user is any sensor used to recognize a timing of an input operation performed by the user, and is not limited to the above-described vibration sensor. The sensor may be, for example, an acceleration sensor, a vibration switch, a pressure sensor, or an electrostatic capacitance sensor. The acceleration sensor or the vibration switch is provided, for example, inside the device 10 in the same manner as the vibration sensor. The pressure sensor or the electrostatic capacitance sensor is provided on, for example, a touch panel of the device 10. For example, the pressure sensor or the electrostatic capacitance sensor may be provided on a sheet or the like bonded to or wound on the arm of the user. For example, the pressure sensor or the electrostatic capacitance sensor may be provided on clothes (sleeves) of the user.

<Method of Recognizing Detection Result in Sensor>

The motion detection unit 2020 recognizes a result of detection by the sensor attached to the body of the user of the input apparatus 2000 (S102). There are various methods in which the motion detection unit 2020 recognizes a result of detection by the sensor. Hereinafter, the methods will be described.

<<Use of Wireless Communication>>

For example, the motion detection unit 2020 performs wireless communication with device 10 having the sensor built thereinto so as to acquire information indicating a result of detection by the sensor, and thus recognizes the result of detection by the sensor 12. For example, the device 10 transmits a predetermined signal to the motion detection unit 2020 at a timing at which the sensor detects vibration of a predetermined magnitude or more. In this case, the motion detection unit 2020 can acquire the result of detection by the sensor that "vibration has been detected by the sensor" by receiving the predetermined signal.

For example, in a case where vibration of a predetermined magnitude or more is detected by the sensor 12, the device 10 may transmit information indicating a time point at which the vibration is detected, to the detection unit 2020.

<<Detection of Change in Appearance of Device 10>>

The device 10 may change appearance of the device 10 according to detection of vibration in the sensor 12. In this case, the device 10 is imaged by using the camera 20. The motion detection unit 2020 recognizes the result of detection by the sensor (detection of the vibration performed by the sensor) by detecting a change in the appearance of the device 10 by using an image including the device 10.

Figure 5:
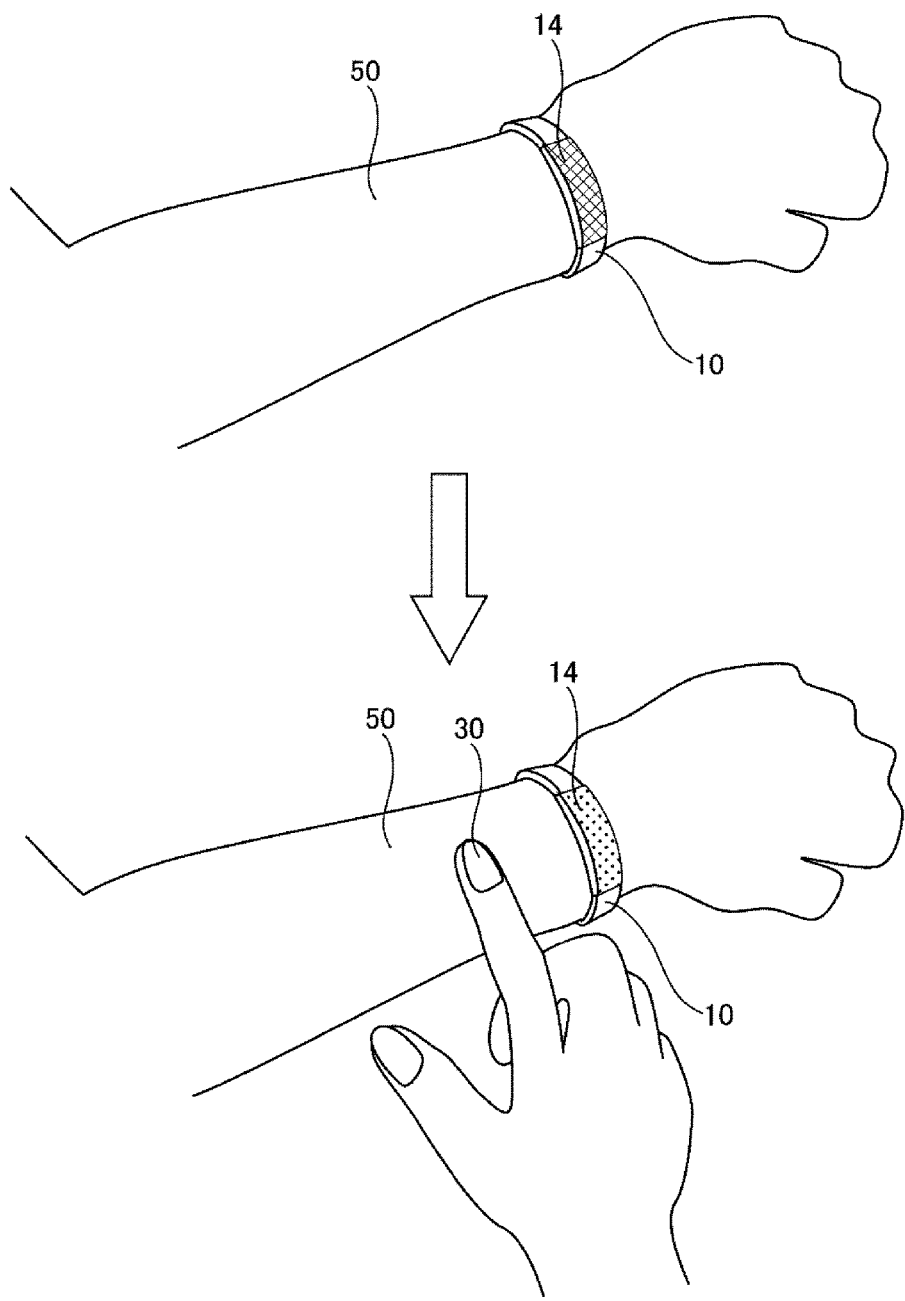
FIG. 5 is a diagram illustrating a scene in which an image displayed on a display screen of a device in a case where the left arm is tapped by a user.

For example, in a case where the device 10 has a display screen, the device 10 changes display on the display screen when vibration of a predetermined magnitude or more is detected by the sensor. More specifically, when vibration of the predetermined magnitude or more is detected by the sensor, the device 10 changes an image displayed on the display screen of the device 10 or displays a new image on the display screen on which nothing has been displayed. The motion detection unit 2020 detects a change in the display on the display screen of the device 10 by analyzing images which are repeatedly generated by the camera 20. Consequently, the motion detection unit 2020 recognizes that the vibration has been detected by the sensor. FIG. 5 is a diagram illustrating a scene in which an image displayed on the display screen of the device 10 is changed in a case where the left arm 50 is tapped by the user.

For example, in a case where vibration is detected by the sensor 12, the device 10 may turn on or flash a light such as a backlight of the display screen of the device 10 or a light emitting diode (LED) light provided in the device 10. The motion detection unit 2020 detects turning-on or flashing of the light by analyzing images repeatedly generated by the camera 20. Consequently, the detection unit 2020 recognizes that the vibration has been detected by the sensor 12.

As mentioned above, if motion detection unit 2020 recognizes detection of vibration by changing the appearance of the device 10 according to the detection of the vibration in the sensor 12, it is not necessary to perform wireless communication between the device 10 and the input apparatus 2000. Thus, the device 10 or the input apparatus 2000 may not have a wireless communication function as long as wireless communication is not necessary for other purpose.

A method in which the motion detection unit 2020 recognizes a result of detection by sensors other than the vibration sensor is the same as the method described for the vibration sensor. In a case where the sensor is an acceleration sensor or a vibration switch, when such a sensor detects acceleration or vibration of a predetermined magnitude or more, the device 10 or the motion detection unit 2020 performs the same process as when the vibration sensor detects vibration of a predetermined magnitude or more. For example, in a case where the sensor is a pressure sensor, when the pressure sensor detects pressure of a predetermined magnitude or more, the device 10 or the motion detection unit 2020 performs the same process as when the vibration sensor detects vibration of a predetermined magnitude or more. For example, in a case where the sensor is an electrostatic capacitance sensor, when the pressure sensor detects displacement of electrostatic capacitance of a predetermined magnitude or more, the device 10 or the motion detection unit 2020 performs the same process as when the vibration sensor detects vibration of a predetermined magnitude or more.

<Method of Acquiring Captured Image>

The motion detection unit 2020 acquires a captured image (S104). There are various methods of the motion detection unit 2020 acquiring a captured image. For example, the motion detection unit 2020 acquires a captured image from the camera 20. In this case, the input apparatus 2000 is communicably connected to the camera 20.

In a case where the camera 20 stores a captured image in an external storage device, the detection unit 2020 acquires the captured image from the storage device. In this case, the motion detection unit 2020 is communicably connected to the storage device.

<Method of Detecting Motion of Object>

The motion detection unit 2020 detects motion of an object in a period defined based on the detection result in the sensor 12 by using the acquired captured image (S106). Hereinafter, a description will be made of each of 1) an object to be handled, 2) a period in which motion of an object is detected, and 3) a method of detecting an object from a captured image.

<<Object to be Handled>>

The motion detection unit 2020 handles a predetermined object as an object. For example, the predetermined object is the user's finger or a pen. In this case, the user performs an input operation by moving the finger or the pen within an imaging range of the camera 20.

For example, the predetermined object may be a mark attached to an object. For example, this mark is attached to the user's body (the finger or the like). For example, the mark is attached to an object (a pen or the like) held by the user. For example, the mark is attached to an object attached to the user. The object attached to the user is, for example, the device 10 having the sensor built thereinto. The user performs an input operation by moving the finger, the pen, or the device 10 attached with the mark within the imaging range of the camera 20.

Information indicating an object to be handled in the motion detection unit 2020 may be set in advance in the motion detection unit 2020, or may be stored in a storage device provided inside or outside the input apparatus 2000.

Note that the motion detection unit 2020 may handle one kind of object or a plurality of kinds of objects.

<<Period in Which Motion of Object is Detected>>

The motion detection unit 2020 acquires a detection result in the sensor. The motion detection unit 2020 detects motion of an object in a period defined based on the detection result in the sensor by using the acquired captured image. Hereinafter, the "period based on the detection result in the sensor" will be referred to as a detection target period. A description will be made of an example of a method of defining the detection target period.

The motion detection unit 2020 uses the detection result in the sensor in order to define the detection target period.

Specifically, the motion detection unit 2020 defines the detection target period based on a sensor timing. The sensor timing is a timing at which vibration or the like is detected by the sensor or a timing close to the timing. For example, in a case where a predetermined signal is transmitted from the device 10 to the motion detection unit 2020 when vibration or the like is detected by the sensor 12, the sensor timing is a time point at which the motion detection unit 2020 receives the predetermined signal. In a case where information indicating a time point at which vibration or the like is detected by the sensor 12 is transmitted from the device 10 to the motion detection unit 2020, the sensor timing is the time point indicated by the information. For example, in a case where a predetermined change is added to the appearance of the device 10 when vibration or the like is detected by the sensor 12, the sensor timing is a time point at which the predetermined change is detected by the motion detection unit 2020.

The motion detection unit 2020 defines the detection target period by using one or two sensor timings. In a case where the detection target period is defined by using a single sensor timing, the motion detection unit 2020 defines a start point and an end point of the detection target period by using the single sensor timing.

In a case where the detection target period is defined by using two sensor timings, the motion detection unit 2020 defines the two sensor timings. Specifically, the motion detection unit 2020 determines a start point of the detection target period by using an earlier sensor timing of the two sensor timings, and determines an end point of the detection target period by using a later sensor timing.

Figure 6A:
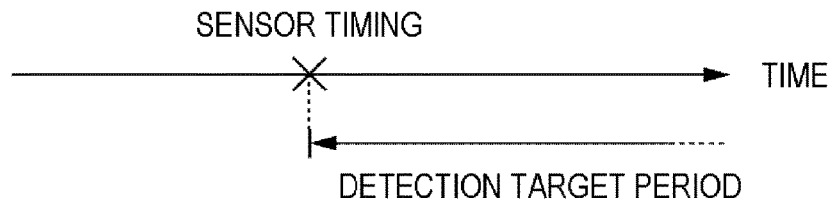
FIG. 6 are diagrams illustrating a method of determining a start point of a detection target period by using a sensor timing.
Figure 6B:
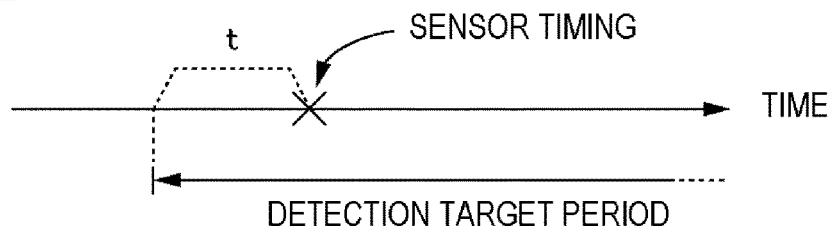
Figure 6C:
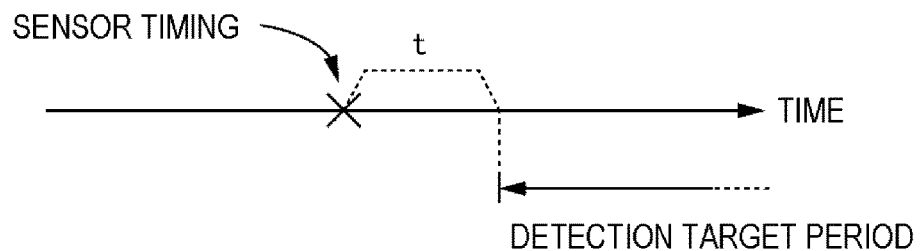

FIG. 6 are diagrams illustrating a method of determining a start point of the detection target period by using a sensor timing. For example, the motion detection unit 2020 sets a sensor timing as a start point of the detection target period (FIG. 6A). For example, the motion detection unit 2020 sets a time point corresponding to a predetermined time before the sensor timing as a start point of the detection target period (FIG. 6B). For example, the motion detection unit 2020 sets a time point corresponding to a predetermined time after the sensor timing as a start point of the detection target period (FIG. 6C).

A method of determining an end point of the detection target period by using a sensor timing is the same as the method of determining a start point of the detection target period by using a sensor timing.

In a case where a time point corresponding to a predetermined time before the sensor timing is set as a start point of the detection target period (FIG. 6B), a captured image including an object imaged after the predetermined time before the sensor timing is required in order to detect motion of the object. Therefore, the camera 20 starts imaging before vibration is detected by the sensor 12. For example, the camera 20 continuously performs imaging until the user finishes use of the input apparatus 2000 from starting thereof. A captured image generated by the camera 20 is continuously stored in a storage device or the like in a predetermined period.

On the other hand, in a case where a sensor timing or a predetermined time after the sensor timing is set as a start point of the detection target period (FIG. 6A or FIG. 6C), the camera 20 may start imaging after vibration is detected by the sensor 12. In this case, for example, the camera 20 receives a signal indicating that vibration has been detected by the sensor 12 from the device 10 or the input apparatus 2000, and starts imaging at a timing of receiving the signal.

Information indicating the predetermined time may be set the motion detection unit 2020 in advance, or may be stored in a storage device which can be accessed from the motion detection unit 2020. A predetermined time used to determine a start point of the detection target period may be the same as or different from a predetermined time used to determine an end point of the detection target period.

<<Method of Detecting Motion of Object from Captured Image>>

The motion detection unit 2020 detects motion of an object by using a captured image including the object imaged in the detection target period. In a case where there are a plurality of captured images including the object imaged in the detection target period, for example, the motion detection unit 2020 recognizes the object from each of the plurality of captured images, and calculates a position of the object included in each captured image. The motion detection unit 2020 uses information indicating a change in position of the object as information indicating motion of the object. The information indicating a change in a position of the object is, for example, information in which positions of the object are arranged in a time series.

It may be a single captured image that includes an object imaged in the detection target period. In a case where an object is being moved, a blurring object is frequently included in a single captured image. Therefore, the motion detection unit 2020 calculates motion of the object from an image of the blurring object included in the single captured image.

Figure 7:
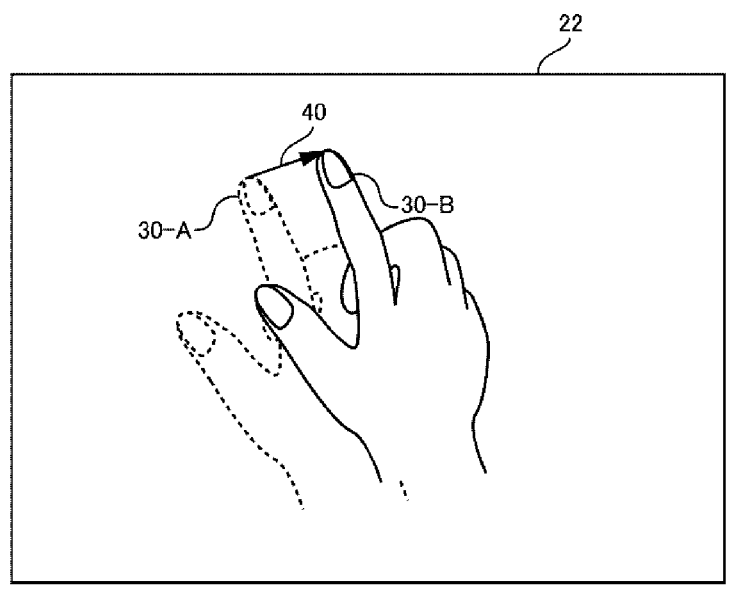
FIG. 7 is a diagram illustrating a captured image including the blurring finger of the user.

FIG. 7 is a diagram illustrating a captured image 22 including the blurring finger of the user. In the captured image 22, the finger 30 of the user blurs so that it moves from the finger 30-A to the finger 30-B. The motion detection unit 2020 detects changes in position of a feature point common to the finger 30-A and the finger 30-B as motion of the object. For example, the motion detection unit 2020 detects motion 40 defined by the change in position of a fingertip of the finger 30-A and a fingertip of the finger 30-B.

<Details of Input Recognition Unit 2040>

The input recognition unit 2040 recognizes input to the information processing apparatus based on the detected motion of the object (S108). The input recognition unit 2040 1) may recognize a shape based on the detected motion of the object as the input to the information processing apparatus, or 2) may recognize a predetermined input operation corresponding to the detected motion of the object as the input to the information processing apparatus.

<<Case Where Shape Based on Motion of Object is Recognized as Input>>

Figure 8A:
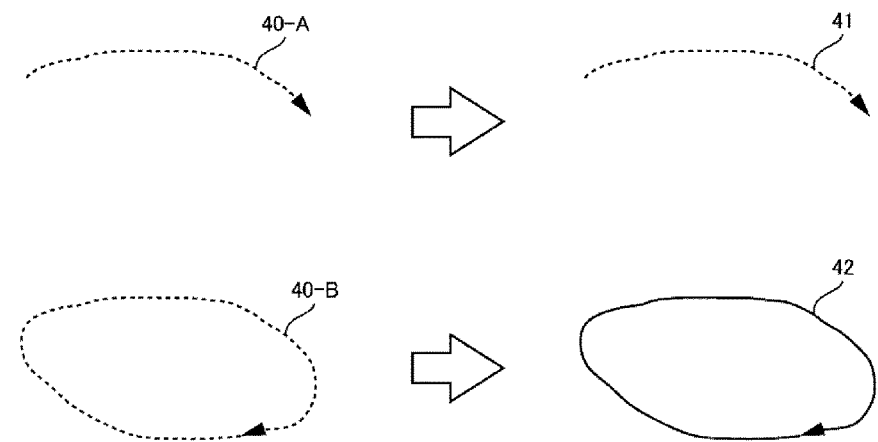
FIG. 8 are diagrams illustrating a scene in which a shape defined by motion of an object is recognized as input.

FIG. 8 are diagrams illustrating a scene in which a shape defined by motion of an object is recognized as input. In FIG. 8A, the input recognition unit 2040 recognizes a shape 41 indicated by motion 40-A of the object or a shape 42 indicated by motion 40-B as input to the information processing apparatus. For example, this input is used for the user to perform handwriting on the information processing apparatus.

Figure 8B:
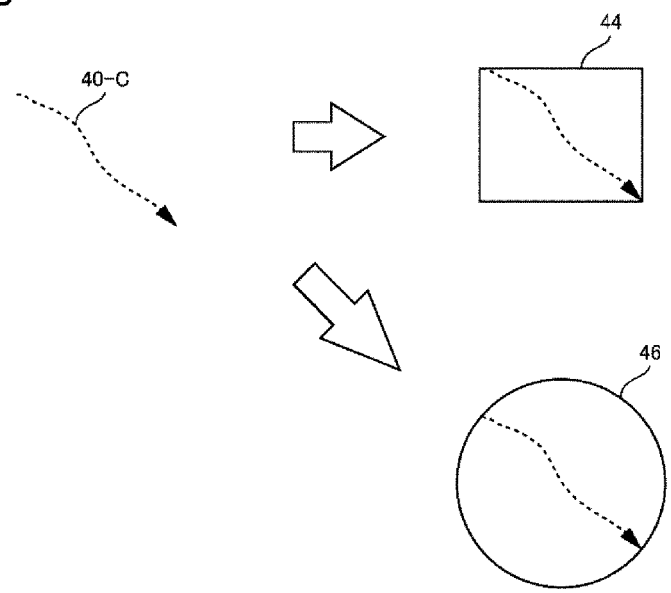

In FIG. 8B, as input to the information processing apparatus, the input recognition unit 2040 recognizes a shape that is different from motion of the object but the shape and size of which are defined by motion of the object. Specifically, as input to the information processing apparatus, the input recognition unit 2040 recognizes a rectangular shape 44, a diagonal line of which is both ends of motion 40-C, or a circular shape 46, a diameter of which is both ends of motion 40-C. For example, this input is used for the user to perform input (a selection operation or the like) indicating a certain range or to draw a predetermined graphic on the information processing apparatus.

Which one of the method illustrated in FIG. 8A and the method illustrated in FIG. 8B is used may be fixed, or may be set by the user. Information indicating which one of the methods is used may be set in the input recognition unit 2040 in advance, or may be stored in a storage device which can be accessed from the input recognition unit 2040.

Here, the input recognition unit 2040 may convert motion (motion of the object included in a captured image) viewed from the front of the camera 20 into each of the above-described shapes, or may convert motion of the object viewed from other angles into each of the above-described shapes. FIG. 9 is a diagram illustrating a scene in which motion of the object is converted into a shape. The captured image 22 is a captured image generated by the camera 20. The user performs motion 40 on the left arm 50. Here, if the motion 40 included in the captured image 22 is converted into a shape according to the method illustrated in FIG. 8B, the motion analysis apparatus 20 is converted into a shape 48. However, since the user handles the left arm 50 as an input plane, input intended by the user is considered to be a shape 49 in which the motion 40 is viewed from the front of the left arm 50 instead of the shape 48 in which the motion 40 is viewed from the front of the camera 20.

Therefore, the input recognition unit 2040 calculates the shape 49 based on motion in which the motion 40 is viewed from the front of the left arm 50, and recognizes the shape 49 as input performed by the user. To do so, the input recognition unit 2040 uses the device 10 attached to the left arm 50 of the user. Specifically, the input recognition unit 2040 extracts a touch panel 14 of the device 10 from a captured image. The input recognition unit 2040 calculates coordinate axes 140 on a plane on the touch panel 14 based on a shape of the extracted touch panel 14. For example, the input recognition unit 2040 sets, as the coordinate axes 140, coordinate axes having the center of the touch panel 14 as the origin, a plane (for example, a plane defined by four corners of the touch panel 14) defined by the touch panel 14 as an XY plane, and a direction orthogonal to the plane as a Z direction. The input recognition unit 2040 calculates the shape 49 having both ends of the motion 40 as both ends of a diagonal line on the plane defined by the coordinate axes 140.

Note that, it may be fixed or set by the user which one of methods is used: the method of converting motion of an object included in the captured image 22 as it is into a shape; or the method of converting motion of an object viewed from other angles (for example, an angle at which the left arm 50 is viewed from the front side) into a shape. Information indicating which one of the methods is used may be set in the input recognition unit 2040 in advance, or may be stored in a storage device which can be accessed from the input recognition unit 2040.

<<Case Where Predetermined Input Operation Corresponding to Motion of Object is Recognized>>

Figure 10A:
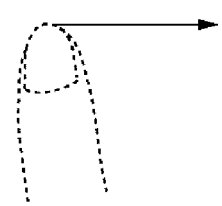
FIG. 10 are diagrams illustrating gesture input.
Figure 10B:
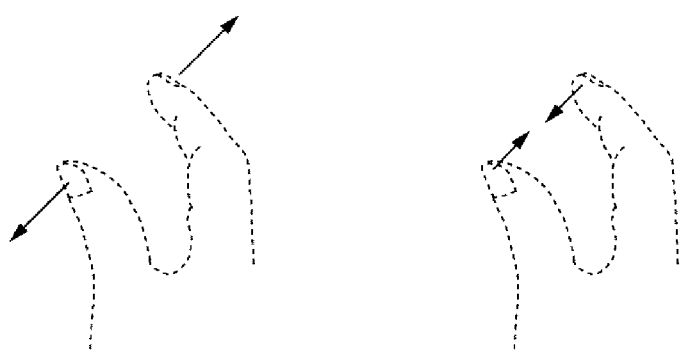

A predetermined input operation corresponding to detected motion of an object is an input operation based on so-called gesture input. FIG. 10 are diagrams illustrating gesture input. FIG. 10A illustrates a flick action, and FIG. 10B illustrates a pinch-in/pinch-out action.

Information in which motion of an object is correlated with a predetermined input operation corresponding to the motion may be set in the input recognition unit 2040 in advance, or may be stored in an internal or external storage device of the input apparatus 2000 in advance.

<Handling of Location Where Action of Moving Object is Performed>

The input recognition unit 2040 1) may recognize only motion of an object as input regardless of a position where an action of moving the object is performed, or 2) may recognize a combination of motion of an object and a position where an action of moving the object is performed as input. In the former case, even if an action of moving an object is performed at any location on the captured image 22, the same motion of the object indicates the same input. On the other hand, in the latter case, a location where an action of moving the object is performed on the captured image 22 has a meaning.

Figure 24:
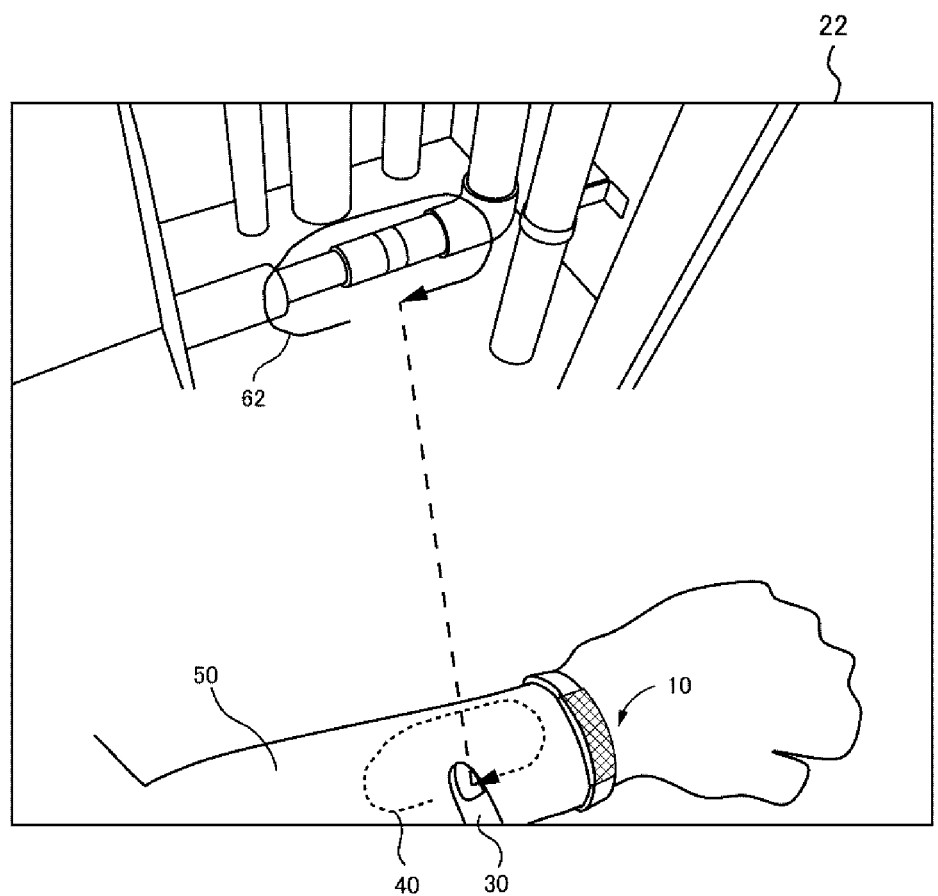
FIG. 24 is a diagram illustrating a scene in which the user performs drawing on an object included in a captured image.

For example, it is assumed that the user performs a drawing operation on an object included in the captured image 22 or an object displayed on a display screen. In this case, not only a drawn shape but also a drawing target has a meaning. FIG. 24 is a diagram illustrating a scene in which the user performs drawing on an object included in the captured image 22. The captured image 22 in FIG. 24 includes a pipe having a rusty part. The user draws a line 62 to surround the rust portion in order to show that there is rust in a part of the pipe included in the captured image 22. In order to recognize this input operation, the input recognition unit 2040 is required to recognize as input not only a shape of the line 62 but also a location where the line 62 is drawn.

In a case of 1), as described above, the input recognition unit 2040 recognizes a shape defined by motion of an object detected by the motion detection unit 2020 or a gesture defined by motion of the object as input.

On the other hand, in a case of 2), the input recognition unit 2040 recognizes transition in a coordinate of the object on the captured image 22, detected by the motion detection unit 2020, as input. Therefore, in FIG. 24, the input recognition unit 2040 recognizes not only the shape of the line 62 but also the position where the line 62 is drawn, as input.

In the case of 2), as a location in which the user performs input, the input recognition unit 2040 may recognize not a location where an action related to an object is performed, but a location separated from the location. In FIG. 24, input is performed by moving the object with a position separated from the object as a target. Hereinafter, a position corresponding to a location where an action related to an object is performed and being recognized as input will be referred to as an input position.

In a case of recognizing input with a location separated from an object as an input position based on motion of the object, the input recognition unit 2040 converts transition in a coordinate of the object on the captured image 22, detected by the motion detection unit 2020, into transition in a coordinate of the input position separated from the object according to a predetermined method.

An input position is relatively defined in advance based on a relationship with a position of an object on the captured image 22. For example, a relationship between an input position and a position of an object is defined based on a two-dimensional positional relationship on the plane of the captured image 22.

Figure 25:
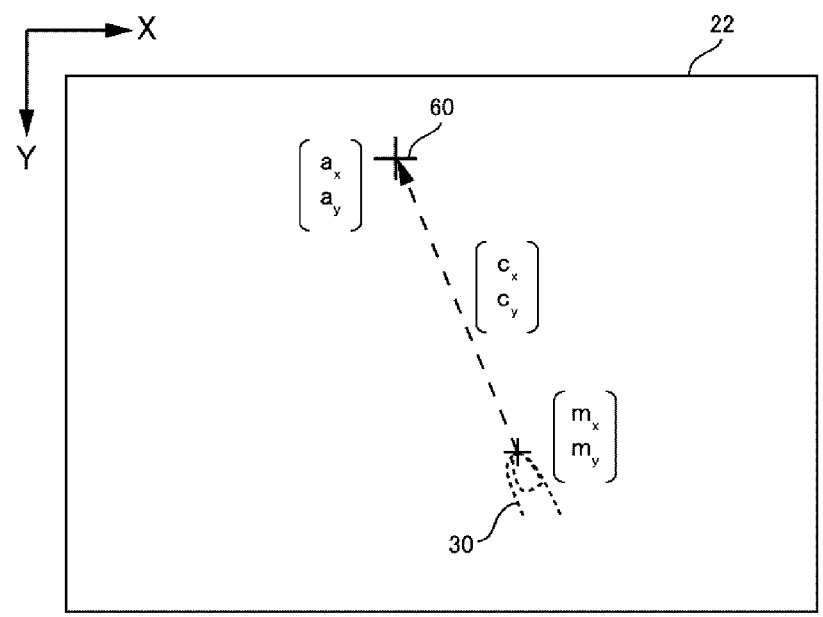
FIG. 25 is a diagram illustrating a relationship between an input position and a position of an object on a plane of a captured image.

FIG. 25 is a diagram illustrating a relationship between an input position 60 and a position of an object on the plane of the captured image 22. A relationship between the input position 60 and a position of the object is defined in the following Equation (1). $(a_x, a_y)$ is a coordinate of the input position 60 in the captured image 22. $(m_x, m_y)$ is a coordinate of the finger 30 in the captured image 22. $(c_x, c_y)$ is a relative position of the input position 60 for the position of the object. In FIG. 25, an object is the finger 30, and a position of the object is a fingertip of the finger 30.

$$\begin{pmatrix} a_x \\ a_y \end{pmatrix} = \begin{pmatrix} m_x \\ m_y \end{pmatrix} + \begin{pmatrix} c_x \\ c_y \end{pmatrix} \quad (1)$$

For example, a position of the input position 60 is defined in advance as a relative position on a three-dimensional space for a position of the object. This three-dimensional space is a three-dimensional space defined by the object included in the captured image 22.

Figure 26:
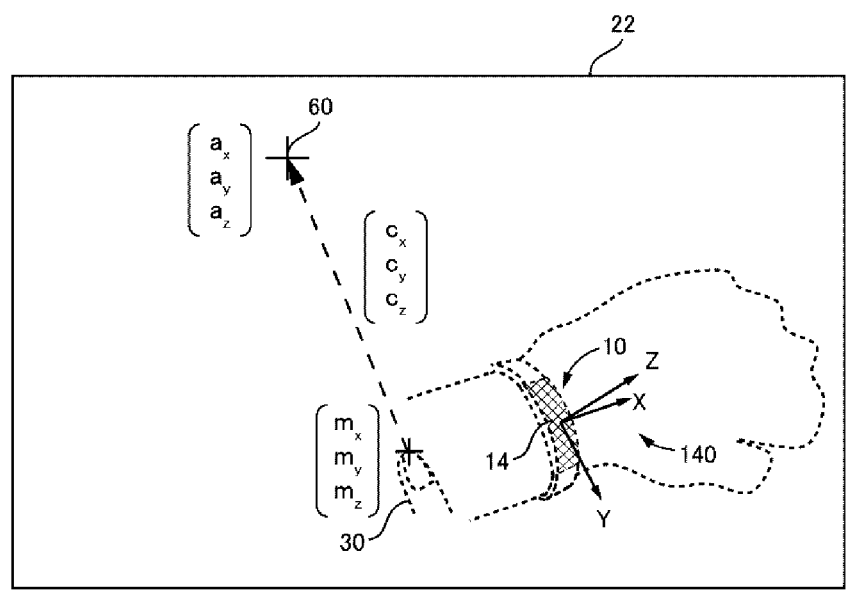
FIG. 26 is a diagram illustrating a relationship between an input position and a position of an object in a three-dimensional space.

FIG. 26 is a diagram illustrating a relationship between the input position 60 and a position of the object on a three-dimensional space. The input recognition unit 2040 determines the coordinate axes 140 by using a predetermined object included in the captured image 22. For example, the input recognition unit 2040 determines the coordinate axes 140 by using the device 10. Specifically, the input recognition unit 2040 handles, as the coordinate axes 140, coordinate axes having the center of the touch panel 14 of the device 10 as the origin, a plane defined by the touch panel 14 as an XY plane, and a direction orthogonal to the plane as a Z direction.

A relationship between the input position 60 and a position of the object is defined on a three-dimensional space defined by the coordinate axes 140 in the following Equation (2). $(a_x, a_y, a_z)$ is a coordinate of the input position 60 on the three-dimensional space defined by the coordinate axes 140. $(m_x, m_y, m_z)$ is a coordinate of a position of the object on the three-dimensional space defined by the coordinate axes 140. $(c_x, c_y, c_z)$ is a relative position of the input position 60 for the position of the object on the three-dimensional space defined by the coordinate axes 140. In FIG. 25, an object is the finger 30, and a position of the object is a fingertip of the finger 30.

$$\begin{pmatrix} a_x \\ a_y \\ a_z \end{pmatrix} = \begin{pmatrix} m_x \\ m_y \\ m_z \end{pmatrix} + \begin{pmatrix} c_x \\ c_y \\ c_z \end{pmatrix} \quad (2)$$

The input recognition unit 2040 converts each of coordinates of positions of the object on a plurality of captured images 22 into a coordinate of the input position 60 by using Equation (1) or (2). The input recognition unit 2040 recognizes information in which a plurality of calculated coordinates of the input position 60 are arranged in a time series, as input performed by the user.

A method of 1) and 2) in which the input recognition unit 2040 recognizes input may be set in the input recognition unit 2040 in advance, may be stored in a storage device which can be accessed from the input recognition unit 2040, or may be selected by the user.

[Example Embodiment 2]

Figure 11:
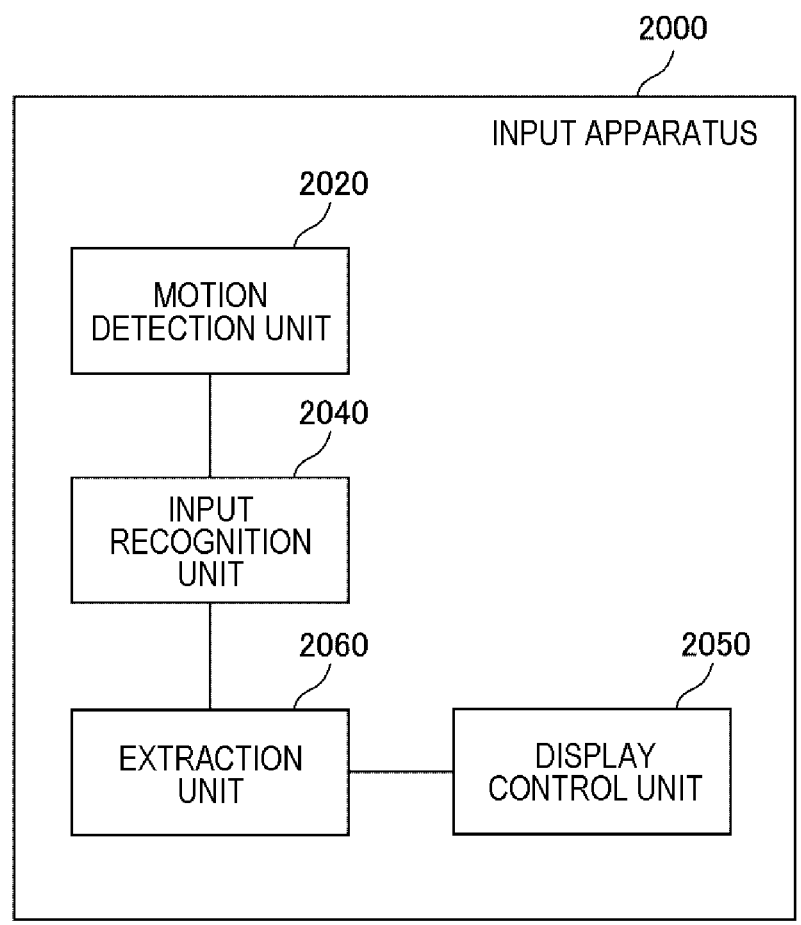
FIG. 11 is a block diagram illustrating an input apparatus according to Example Embodiment 2.

FIG. 11 is a block diagram illustrating an input apparatus 2000 according to Example Embodiment 2. In FIG. 11, each block indicates not a configuration in the hardware unit but a configuration in the functional unit.

Figure 12:
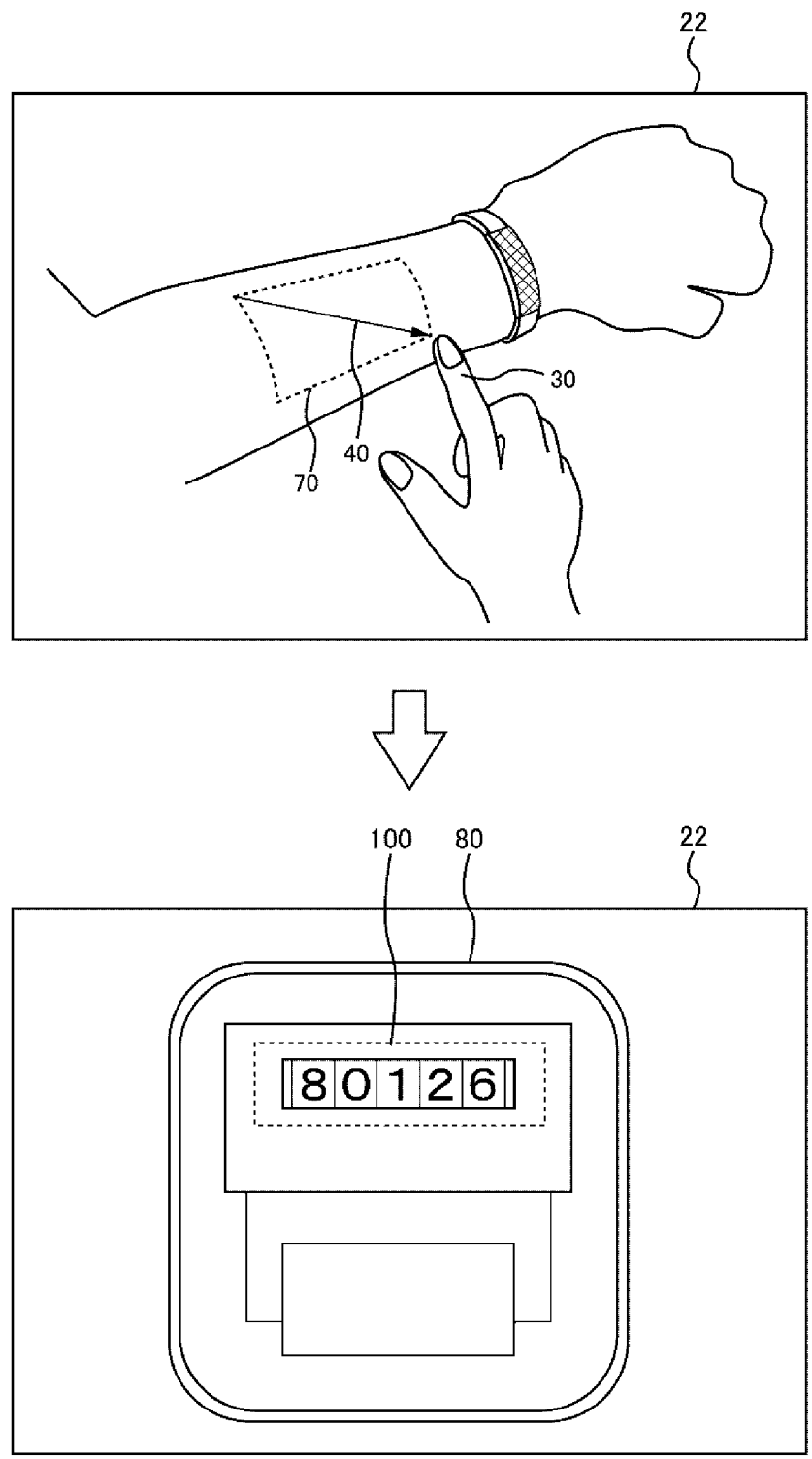
FIG. 12 is a diagram for conceptually explaining an operation of the input apparatus of Example Embodiment 2.

FIG. 12 is a diagram for conceptually explaining an operation of the input apparatus 2000 of Example Embodiment 2. In the input apparatus 2000 of Example Embodiment 2, the input recognition unit 2040 recognizes input drawing a region based on motion of an object included in the captured image 22. Hereinafter, a region recognized by the input recognition unit 2040 will be referred to as a first region. The first region is, for example, a rectangular region or a circular region. The first region in FIG. 12 is a rectangular region 70 drawn based on the motion 40 of the finger 30 on the left arm 50 of the user.

The input apparatus 2000 extracts a range defined based on the region from the captured image 22 which is generated after the input is recognized. In FIG. 12, after the input of the rectangular region 70 is recognized, a meter 80 is imaged by the camera 20, and, as a result, a captured image 90 is generated. The input apparatus 2000 extracts a range (a result of measurement by the meter 80) included in a rectangular region 100 of the captured image 90. The rectangular region 100 is a region defined by the rectangular region 70. For example, the input apparatus 2000 analyzes the extracted image so as to calculate the result of measurement by the meter 80.

In order to realize the function, the input apparatus 2000 of Example Embodiment 2 includes a display control unit 2050 and an extraction unit 2060. The input recognition unit 2040 of Example Embodiment 2 recognizes input drawing the first region based on motion of the object as described above. The display control unit 2050 displays on the display screen a second region defined based on the first region. The extraction unit 2060 extracts a partial image included in a range corresponding to the second region from an image generated by the camera 20 after the input drawing the first region is recognized by the input recognition unit 2040.

Hereinafter, the input apparatus 2000 of Example Embodiment 2 will be described in more detail.

<Flow of Process>

FIG. 13 is a flowchart illustrating a flow of a process performed by the input apparatus 2000 of Example Embodiment 2. The input recognition unit 2040 recognizes input drawing the first region based on motion of the object (S202). The display control unit 2050 generates the second region based on the first region (S204). The display control unit 2050 displays the second region on the display screen (S206). The extraction unit 2060 extracts a partial image included in a range corresponding to the second region from a captured image generated by the camera 20 (S208).

<Details of Input Recognition Unit 2040>

The input recognition unit 2040 recognizes input drawing the first region based on motion of the object (S202). For example, the first region is a region indicated by motion of the object. For example, the first region is a region indicating a predetermined shape defined by motion of the object. For example, the first region is the shape 42, the rectangular shape 44, or the circular shape 46 exemplified in FIG. 8.

<Details of Display Control Unit 2050>

<<Method of Generating Second Region>>

The display control unit 2050 generates the second region based on the first region (S204). There are various methods in which the display control unit 2050 generates the second region based on the first region. For example, the display control unit 2050 generates a region having the same size and the same shape as those of the first region as the second region.

For example, the display control unit 2050 generates a region the shape of which is the same as (similar to) that of the first region and the size of which is different therefrom as the second region. Specifically, the display control unit 2050 handles a region the shape of which is the same as that of the first region and the area of which is a predetermined area.

For example, the display control unit 2050 may deform a shape of the first region according to a predetermined method so as to generate the second region. Conceptually, the display control unit 2050 corrects the first region to have a shape intended by the user.

Figure 14A:
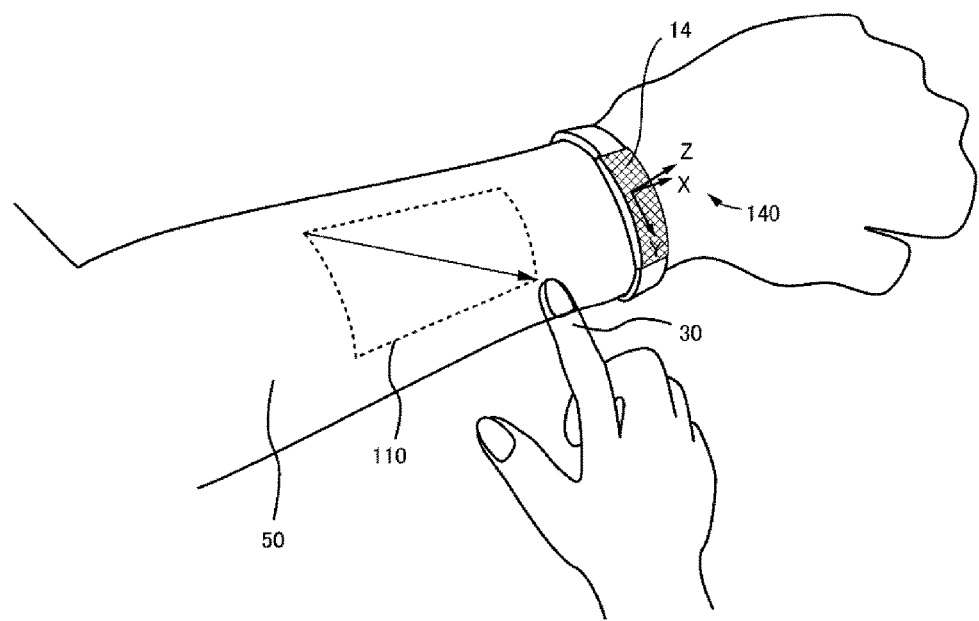
FIG. 14 are diagrams illustrating a scene in which a display control unit corrects a shape of a first region so as to generate a second region.

FIG. 14 are diagrams illustrating a scene in which the display control unit 2050 corrects a shape of the first region so as to generate the second region. FIG. 14A illustrates a scene included in the captured image 22. The user performs input indicating a first region 110 on the left arm 50. Here, since the camera 20 does not image the left arm 50 from the front side, a shape of the first region 110 included in the captured image 22 is a shape in which a rectangular shape is viewed from an obliquely upper side. However, since the user is considered to draw a shape viewed with the eyes in a case where the left arm 50 is viewed from the front side, a shape of the first region 110 intended by the user is considered to be a rectangular shape.

Figure 14B:
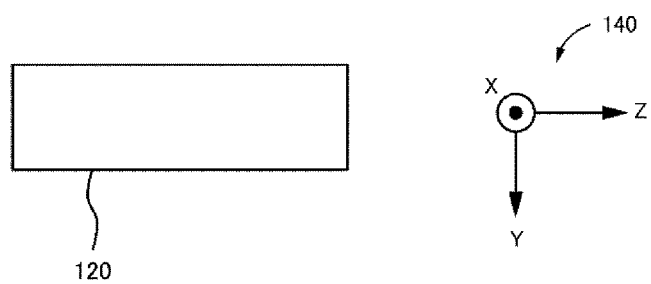

Therefore, the display control unit 2050 corrects the shape of the first region 110. FIG. 14B is a diagram illustrating a second region 120 generated by correcting the shape of the first region 110. In FIG. 14, the display control unit 2050 extracts the touch panel 14 of the device 10 mounted on the left arm 50 of the user from a captured image. The display control unit 2050 calculates coordinate axes 140 on a plane on the touch panel 14 based on a shape of the extracted touch panel 14. The display control unit 2050 converts the shape of the first region 110 by using the coordinate axes 140 so as to generate the second region 120.

Figure 31A:
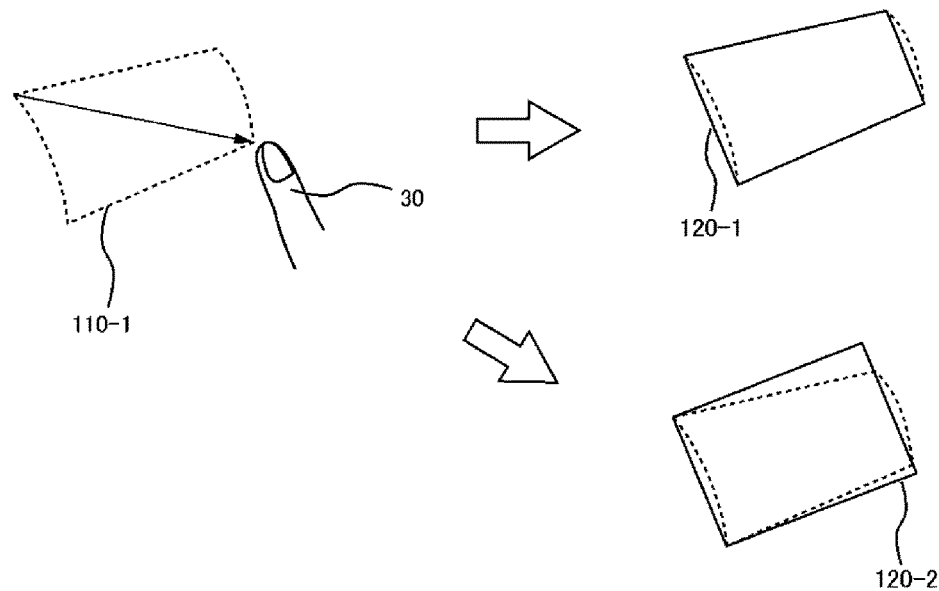
FIG. 31 are second diagrams illustrating a scene in which a display control unit corrects a shape of a first region so as to generate a second region.

Note that a method of correcting a shape of the first region is not limited to the method illustrated in FIG. 14. FIG. 31 are second diagrams illustrating a scene in which the display control unit 2050 corrects a shape of the first region so as to generate the second region. In an example illustrated in FIG. 31A, the display control unit 2050 corrects a first region 110-1 so as to generate a second region 120-1 or a second region 120-2. The second region 120-1 is a trapezoid obtained by connecting four vertexes of the first region 110-1 to each other with straight lines. The second region 120-2 is a rectangle has a rectangular shape having an upper side and a bottom side of the second region 120-1 as short sides. Note that a well-known technique may be used as a technique of converting a trapezoid into a rectangle through correction.

Figure 31B:
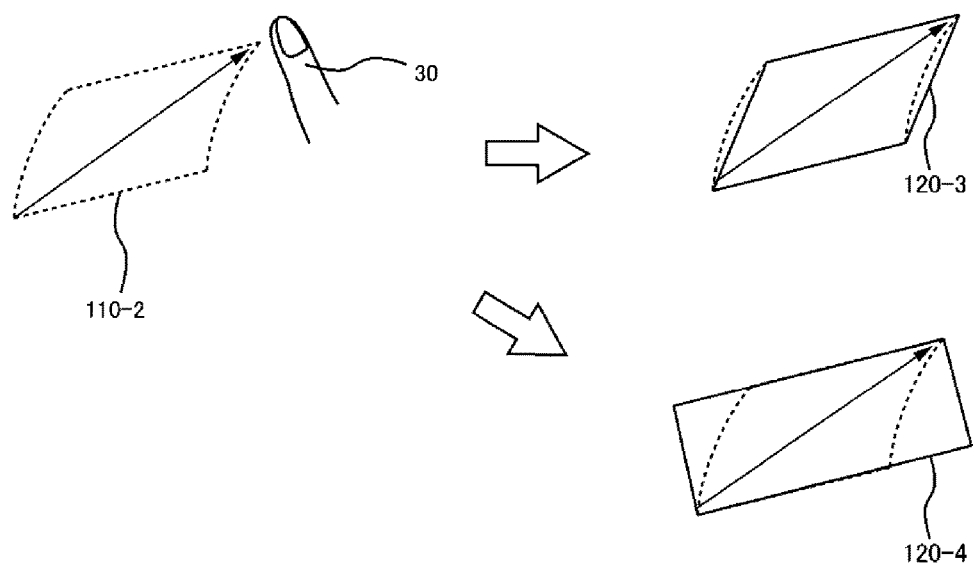

In an example illustrated in FIG. 31B, the display control unit 2050 corrects a first region 110-2 so as to generate a second region 120-3 or a second region 120-4. The second region 120-3 has a parallelogram obtained by connecting four vertexes of the first region 110-2 to each other with straight lines. The second region 120-2 is a rectangle having an upper side and a bottom side of the second region 120-4 as long sides. Note that a well-known technique may be used as a technique of converting a parallelogram into a rectangle through correction.

Note that a method used for the display control unit 2050 to generate the second region among the above-described methods may be fixed in advance, or may be set by the user. Information indicating the method to be used may be set in the display control unit 2050 in advance, or may be stored in a storage device which can be accessed from the display control unit 2050.

<<Method of Displaying Second Region>>

The display control unit 2050 displays the second region on the display screen (S206). Here, the display control unit 2050 displays the second region such that the user viewing the display screen can view a scene in which the second region and a captured image generated by the camera 20 overlaps each other.

For example, the display control unit 2050 displays both of the captured image and the second region on the display screen such that the captured image overlaps the second region. Consequently, the user can view a scene in which the captured image and the second region overlap each other. Note that the captured image and the second region may be projected onto a wall or the like by a projector. In this case, a projection surface is a display screen.

In a case where the display screen is a display screen of a transmissive head mounted display mounted on the user, the display control unit 2050 may not display a captured image. In this case, the camera 20 is provided on the head mounted display so as to perform imaging in the same direction as a view of the user wearing the head mounted display or a direction close thereto. As a result, scenery of the real world viewed in front of the display screen becomes the same as scenery included in the captured image.

Therefore, the display control unit 2050 displays the second region on the display screen of the head mounted display. Consequently, the user wearing the head mounted display can view "the scenery in which the scenery of the real world viewed in front of the display screen overlaps the second region displayed on the display screen", and this scenery shows a scene in which the captured image and the second region overlap each other.

<<Display Position of Second Region>>

As described in Example Embodiment 1, the input recognition unit 2040 1) may recognize only motion of an object as input regardless of a position where an action of moving the object is performed, or 2) may recognize a combination of motion of an object and a position where an action of moving the object is performed as input. In a case of 1), input performed by the user defines a shape of the second region, and does not include specifying of a position of the second region. Thus, a display position of the second region is not specified by the user. Therefore, the display control unit 2050 displays the second region, for example, at a predetermined position on the display screen (the center or the like of the display screen).

Figure 27:
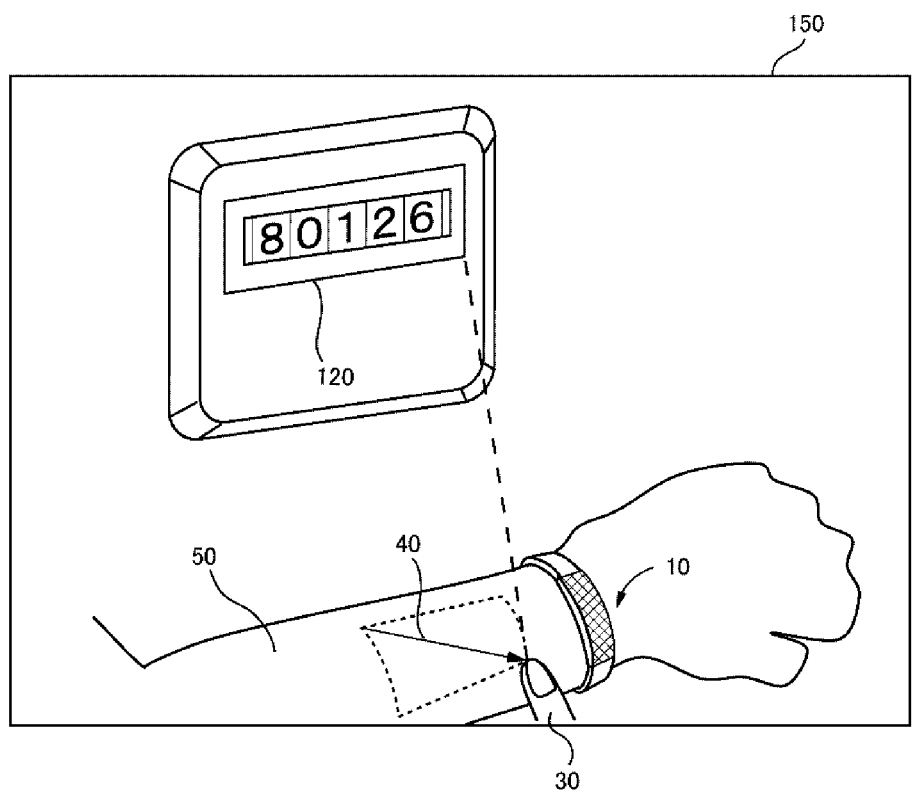
FIG. 27 is a diagram illustrating a scene in which a second region is displayed at a position defined by an input operation performed by the user.

On the other hand, in a case of 2), input performed by the user includes not only a shape of the second region but also a position of the second region on the captured image 22. Therefore, the display control unit 2050 displays the second region at a position on the display screen defined by the input performed by the user. FIG. 27 is a diagram illustrating a scene in which the second region is displayed at a position defined by input performed by the user. The user performs the motion 40 on the left arm 50 so as to perform input drawing a rectangular shape surrounding a meter portion of a gauge. As a result, the display control unit 2050 displays the second region 120 in the meter portion on a display screen 150.

The display control unit 2050 displays the second region at a position on the display screen corresponding to the position on the captured image. In a case where a captured image is displayed on a display screen (for example, in a case where the display screen is a display screen of a non-transmissive head mounted display), the display control unit 2050 displays on the display screen a captured image so that the second region is superimposed thereon at a position specified by input performed by the user.

On the other hand, in a case where a captured image is not displayed on a display screen (for example, in a case where the display screen is a display screen of a transmissive head mounted display), the display control unit 2050 calculates a position on the display screen based on a position of the second region on the captured image specified by input performed by the user by using a correspondence relationship (a conversion equation for converting a coordinate on the captured image into a coordinate on the display screen) between a coordinate on the captured image and a coordinate on the display screen. The display control unit 2050 displays the second region at the calculated position on the display screen.

The correspondence relationship between a coordinate on the captured image and a coordinate on the display screen is defined based on various parameters (an angle of view or a focal length) related to the camera 20, or a positional relationship between the display screen and the camera 20. The correspondence relationship may be calculated by the display control unit 2050 by using the parameters or the like, or may be set in advance as a set value.

<<Movement or Deformation of Second Region>>

The second region displayed on the display screen may be moved or deformed. For example, the display control unit 2050 receives an operation using an input device such as a mouse or an input operation on the input recognition unit 2040 described in Example Embodiment 1 from the user, and moves or deforms the second region based on this operation. An operation of moving the second region is, for example, a drag operation. An operation of deforming the second region is, for example, a pinch-in/pinch-out operation. A partial image desired by the user can be extracted by the extraction unit 2060 which will be described later by moving or deforming the second region.

Figure 15A:
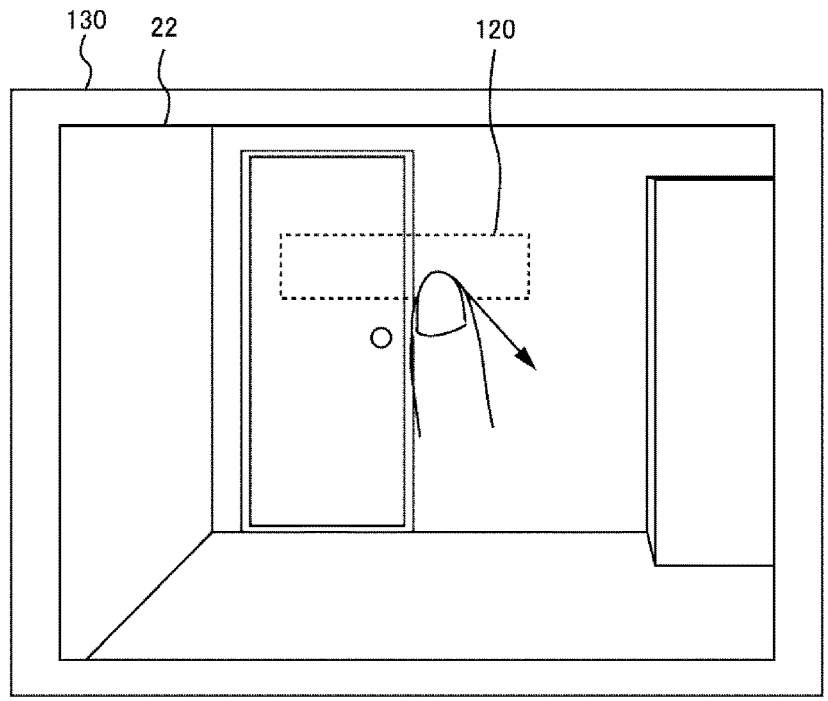
FIG. 15 are diagrams illustrating a scene in which the second region is displayed on a display screen so as to be superimposed on a captured image.
Figure 15B:
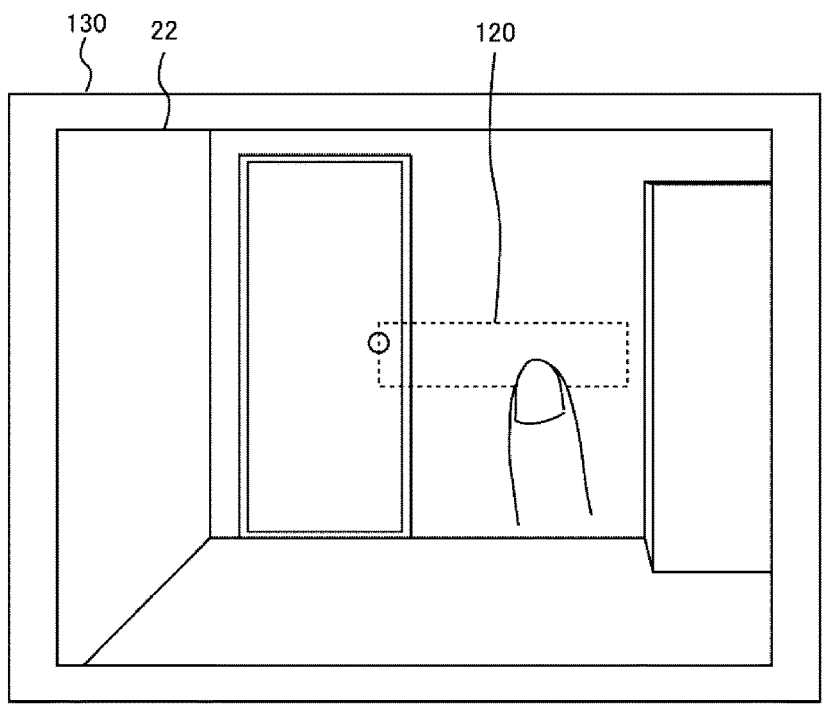

FIG. 15 are diagrams illustrating a scene in which the second region is displayed on the display screen so as to be superimposed on the captured image. In FIG. 15, the display control unit 2050 projects the captured image 22 and the second region 120 onto a projection surface 130. FIG. 15A illustrates a scene before the user moves the second region 120. On the other hand, FIG. 15B illustrates a scene after the user moves the second region 120. Images included in the second region 120 are changed in FIGS. 15A and 15B by the user moving the second region 120.

The user may change a position of the second region on the camera 20 by changing an imaging range of the camera 20. In a case where the camera 20 is a camera provided on a head mounted display, the user may cause a desired portion in a captured image to be included in the second region by changing a direction of the face thereof. For example, in a case where the camera 20 is a camera provided in a room, the user may cause a desired portion in a captured image to be included in the second region by changing a process or a zoom ratio of the camera by using a remote controller or the like.

Figure 16A:
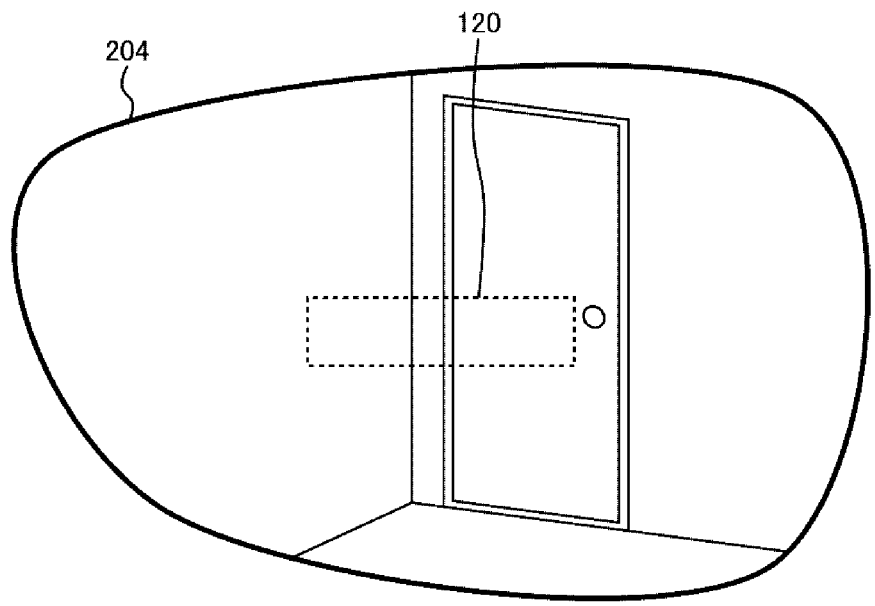
FIG. 16 are diagrams illustrating the second region displayed on a display screen of a head mounted display.
Figure 16B:
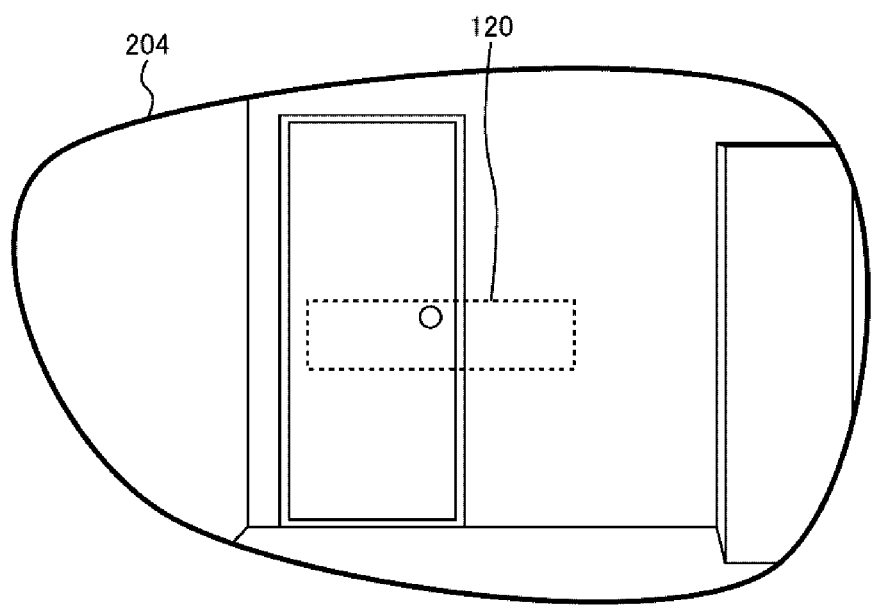

FIG. 16 are diagrams illustrating the second region displayed on a display screen of a head mounted display. A display 204 is a display screen formed as a lens portion of a glasses type head mounted display. FIG. 16A illustrates a scene before the user wearing the head mounted display changes a direction of the face thereof. On the other hand, FIG. 16B illustrates a scene after the user changes a direction of the face thereof.

The second region 120 is displayed at the center of the display 204 in both of FIGS. 16A and 16B. However, a partial image included in the second region 120 is changed in FIGS. 16A and 16B by changing the direction of the face of the user.

<Details of Extraction Unit 2060>

The extraction unit 2060 extracts a partial image included in a range corresponding to the second region from a captured image generated by the camera 20 (S208). In a case where the second region is displayed while being superimposed on a captured image (for example, in a case where the display screen is a display screen of a non-transmissive head mounted display), a range on the captured image corresponding to the second region is a range that is on the captured image and on which the second region is superimposed.

On the other hand, in a case where the second region is displayed while not being superimposed on a captured image (for example, in a case where the display screen is a display screen of a transmissive head mounted display), the captured image is not displayed on the display screen. In this case, the extraction unit 2060 maps the second region on the display screen onto the captured image based on a correspondence relationship (a conversion equation for converting a coordinate on the captured image into a coordinate on the display screen) between a coordinate on the captured image and a coordinate on the display screen. The extraction unit 2060 extracts the partial image by extracting an image included in the mapped region.

Note that the correspondence relationship between a coordinate on the captured image and a coordinate on the display screen is defined based on various parameters (an angle of view or a focal length) related to the camera 20, or a positional relationship between the display screen and the camera 20. The correspondence relationship may be calculated by the extraction unit 2060 by using the parameters or the like, or may be set in advance as a set value.

The extraction unit 2060 extracts the partial image from the captured image at various timings. For example, the input apparatus 2000 receives a predetermined operation for giving an instruction for extracting the partial image from the user. The extraction unit 2060 extracts the partial image in a case where this predetermined operation is recognized by the input apparatus 2000. The predetermined operation may be an operation using an input device such as a mouse, or may be an input operation on the input recognition unit 2040 described in Example Embodiment 1.

For example, in a case where the display control unit 2050 receives an operation of moving or deforming the second region, the extraction unit 2060 may extract a partial image in a case where such an operation is not recognized for a predetermined time or more. For example, in a case where a position of the second region on a captured image is changed by the user changing an imaging range of the camera 20, the extraction unit 2060 may extract a partial image in a case where the imaging range of the camera 20 is not changed for a predetermined time or more.

<Hardware Configuration Example>

Figure 17:
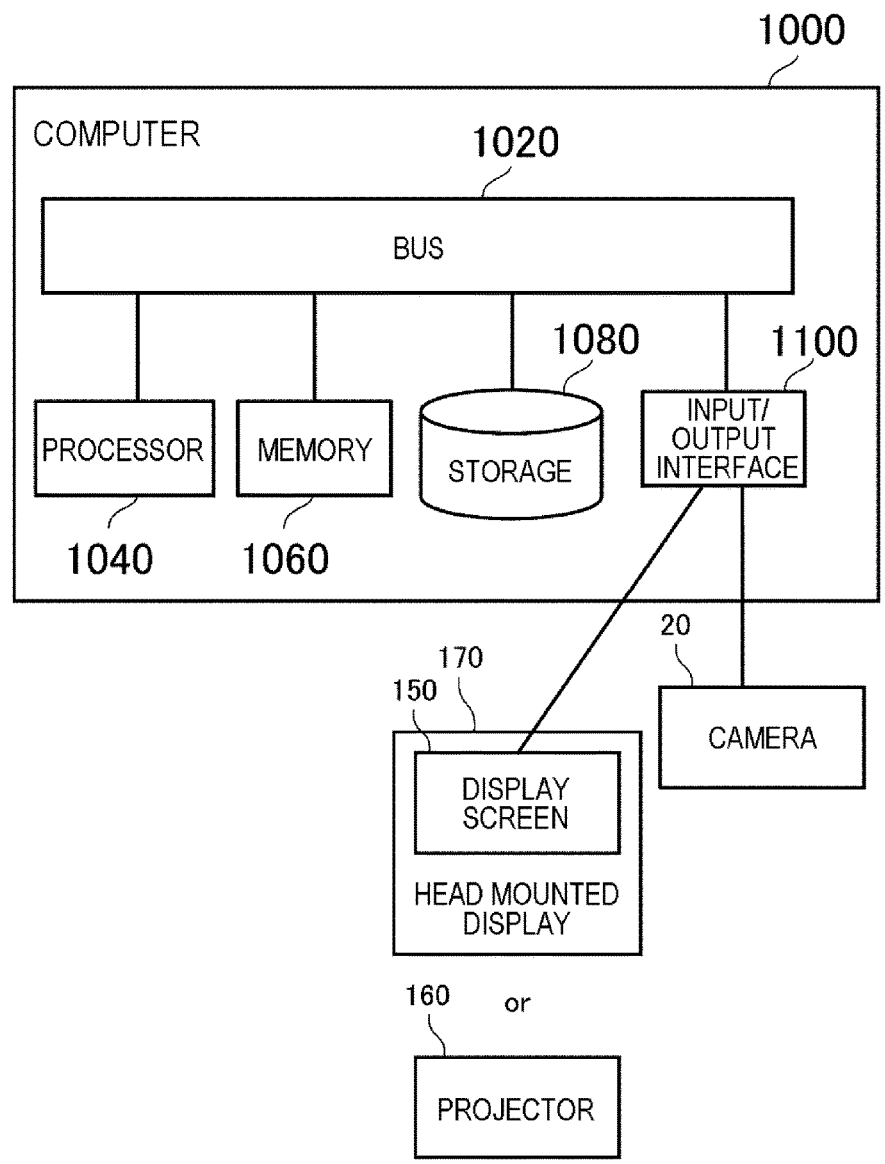
FIG. 17 is a diagram illustrating a hardware configuration of a computer realizing the input apparatus of Example Embodiment 2.

FIG. 17 is a diagram illustrating a hardware configuration of the computer 1000 realizing the input apparatus 2000 of Example Embodiment 2. A configuration of the computer 1000 is the same as the configuration of the computer 1000 realizing the input apparatus 2000 of Example Embodiment 1. However, the storage 1080 of the computer 1000 of Example Embodiment 2 further includes a program module for realizing each function of the input apparatus 2000 of the present example embodiment.

The input/output interface 1100 is connected to the display screen 150 on which the second region is displayed, or a projector 160 which projects the second region onto a projection surface. The display screen 150 may be a display screen of a liquid crystal display, or may be a display screen of a head mounted display. In the configuration illustrated in FIG. 17, the display screen 150 is a display screen of a head mounted display 170.

The head mounted display 170 is any head mounted display having the display screen 150 included in a view of the user. For example, the display screen 150 is a non-transmissive display. In this case, the head mounted display 170 displays an image captured by a camera imaging the periphery of the user (for example, a face direction of the user) and an image indicating other objects in an overlapping manner on the display screen 150. The user can view a scene in which the other objects are superimposed on the peripheral scenery, by viewing the display screen 150. Note that the "camera imaging the periphery of the user" may be the camera 20, or may be a camera provided separately therefrom.

For example, the display screen 150 is a transmissive display. In this case, the user can view both of a real object present in front of the display screen 150 and an image displayed on the display screen 150.

<Advantageous Effects>

According to the present example embodiment, a partial image corresponding to a region based on input performed by a user is extracted from a captured image. With this configuration, the user can easily input a region desired to be extracted from a captured image.

EXAMPLE

Hereinafter, the input apparatus 2000 will be described by using a more specific Example. Note that this Example is an example of a usage method for the input apparatus 2000, and does not limit a usage method for the input apparatus 2000.

In the present example, two devices such as glasses 200 and a watch 210 are used for an operation of the input apparatus 2000. FIG. 18 is a diagram illustrating the glasses 200 and the watch 210.

The glasses 200 are a head mounted display provided with a camera 202. In the present example, the input apparatus 2000 is built into the glasses 200. The user wears the glasses 200 such as spectacles.

The camera 202 is a video camera, and corresponds to the camera 20 in each of the above-described example embodiments. The display 204 is a transmissive display having a lens shape. The glasses 200 display various pieces of information on the display 204. Consequently, the user's eyes view the various pieces of information so as to be superimposed on the scenery of the real world.

The watch 210 has a vibration sensor 211 built thereinto. The watch 210 has a touch panel 212. The watch 210, the vibration sensor 211, and the touch panel 212 respectively correspond to the device 10, the sensor 12, and the touch panel 14 in Example Embodiment 1 or Example Embodiment 2.

The glasses 200 and the watch 210 form an input system which functions as an input interface for an information processing apparatus. An information processing apparatus which is an operation target of the input system may be the glasses 200 or the watch 210, or may be other computers. In the present example, an operation target information processing apparatus is assumed to be the glasses 200.

Figure 19:
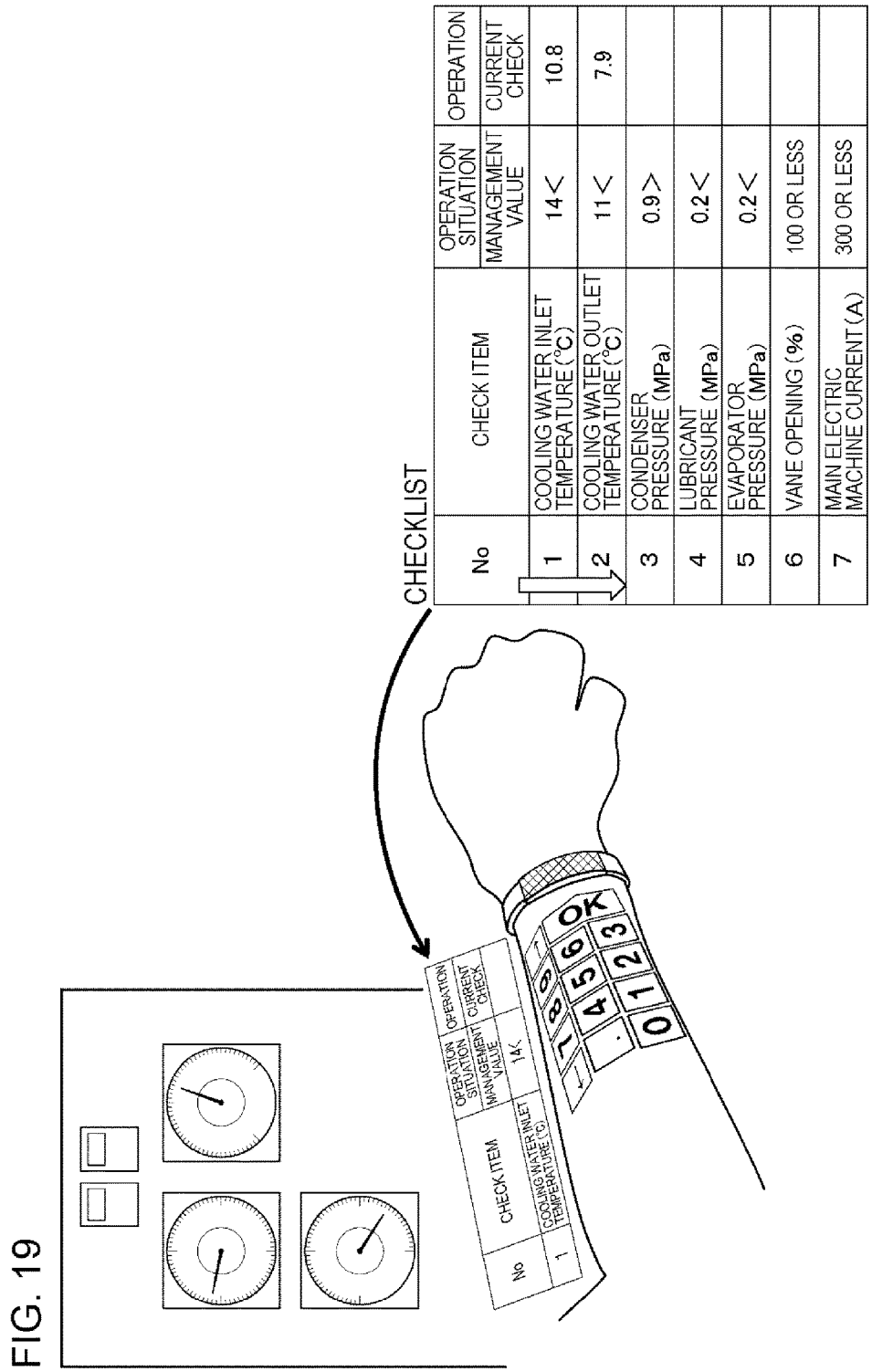
FIG. 19 is a diagram illustrating a summary of checking work performed by a user.

In the present example, the user performs checking work on an instrument by using the glasses 200 and the watch 210. FIG. 19 is a diagram illustrating a summary of checking work performed by the user. The user performs reading work on a meter indicating a state of each instrument, or records a memo or takes a picture with respect to a portion of the instrument to be concerned by the user, according to a checklist.

An input operation on the glasses 200 is roughly classified into two operations. A first input operation is an input operation performed by moving a predetermined object within a predetermined imaging range of the camera 202. This operation is an input operation described in Example Embodiment 1 or 2. A state in which the glasses 200 receive this operation is referred to as a first input mode. A second input operation is an input operation performed by performing an operation on an operation image displayed on the display 204. A state in which the glasses 200 receive this operation is referred to as a second input mode. Note that the specific content of an operation in the second input mode will be described later.

Figure 20:
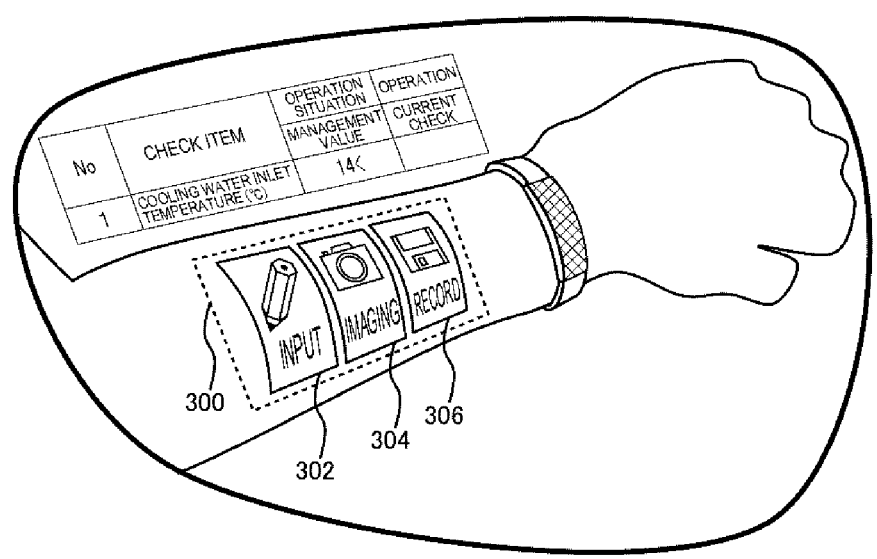
FIG. 20 is a diagram illustrating an operation selection menu included in a view of the user.

If the user starts checking work, the glasses 200 displays a first item of the checklist and an operation selection menu 300 on the display 204. FIG. 20 is a diagram illustrating the operation selection menu 300 included in a view of the user. The operation selection menu 300 includes three operation images such as an input button 302, an imaging button 304, and a record button 306. Here, the glasses 200 display this item such that the first item of the checklist is viewed around the left arm 50 to which the watch 210 is attached when viewed from the user's eyes. The glasses 200 display the operation selection menu such that the operation selection menu is viewed on the left arm 50 to which the watch 210 is attached when viewed from the user's eyes.

The user performs an operation of selecting an operation image. Specifically, the user performs an operation of tapping an operation image to be selected. Then, the watch 210 detecting vibration of the tapping changes an image displayed on the touch panel 212. Next, the glasses 200 detect that the image displayed on the touch panel 212 has been changed, and thus performs a process of recognizing input.

The current state of the glasses 200 is the second input mode in which selection of the operation image is received. Thus, the glasses 200 determine which operation image is selected by the user as a result of detecting that the image displayed on the touch panel 212 has been changed. Specifically, the glasses 200 detect a position of the user's finger from a captured image generated by the camera 202, and determine which position of an operation image included in the operation selection menu 300 corresponds to that position.

Figure 21:
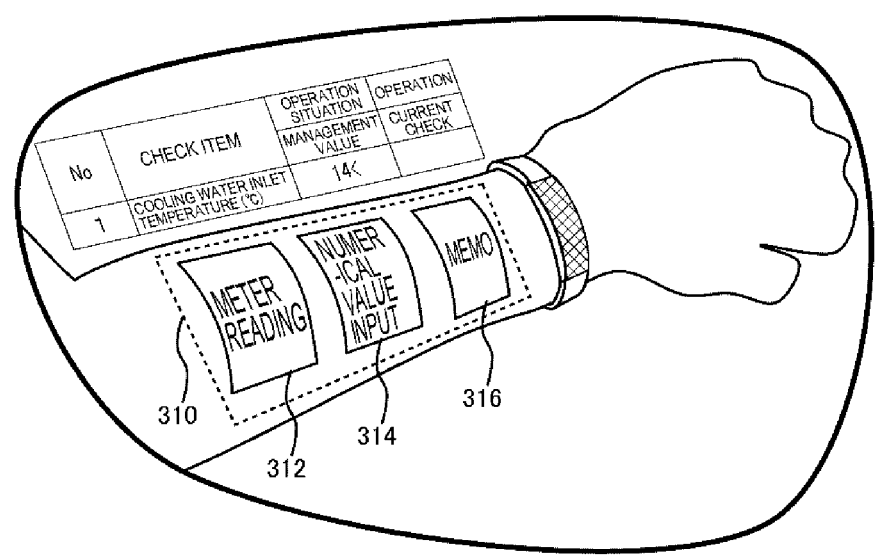
FIG. 21 is a diagram illustrating an input method selection menu included in the view of the user.

If the user selects the input button 302 from the operation selection menu 300, the glasses 200 display an input method selection menu 310 on the display 204. FIG. 21 is a diagram illustrating the input method selection menu 310 included in the view of the user. The input method selection menu 310 includes three operation images such as a meter reading button 312, a numeric input button 314, and a memo button 316.

The meter reading button 312 is an input operation of automatically reading a value of a meter from a captured image generated by the camera 202. For example, the user performs the input operation illustrated in FIG. 27 described in Example Embodiment 2 so as to input the second region 120 indicating the meter portion of the gauge. The extraction unit 2060 generates a partial image of the meter portion based on the second region 120. The input apparatus 2000 performs character string recognition on the meter portion so as to determine a value of the meter. Consequently, the value of the meter is automatically read. If the user selects the meter reading button 312, the glasses 200 transition to the first input mode. In a case where automatic reading of a value of the meter is finished, the glasses 200 transition to the second input mode again.

Figure 22:
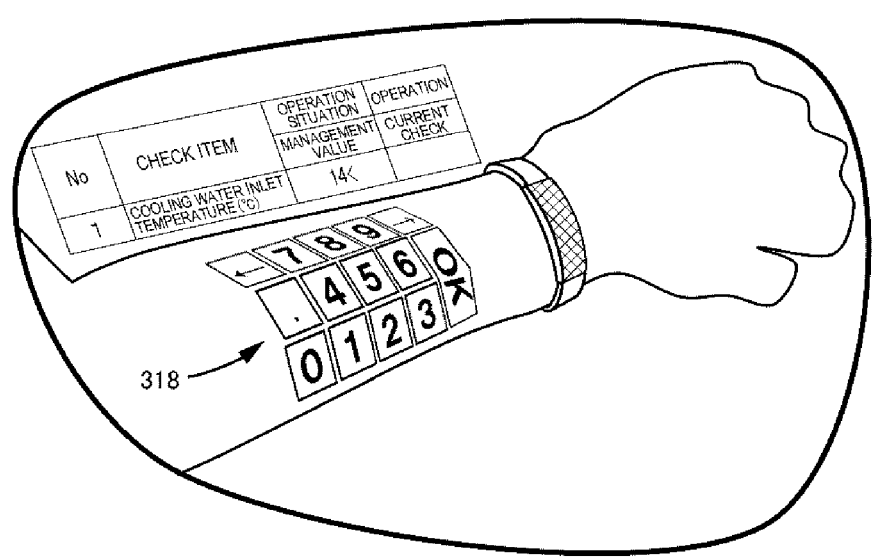
FIG. 22 is a diagram illustrating a scene after a numeric input button is selected.

The numeric input button 314 is an input operation of the user inputting a value of the meter. FIG. 22 is a diagram illustrating a scene after the numeric input button 314 is selected. The glasses 200 display a numeric pad image 318 on the display 204 such that the numeric pad image 318 is viewed so as to be superimposed on the left arm 50. The user inputs a numeric value of the meter by tapping each key of the numeric pad image 318.

Figure 23:
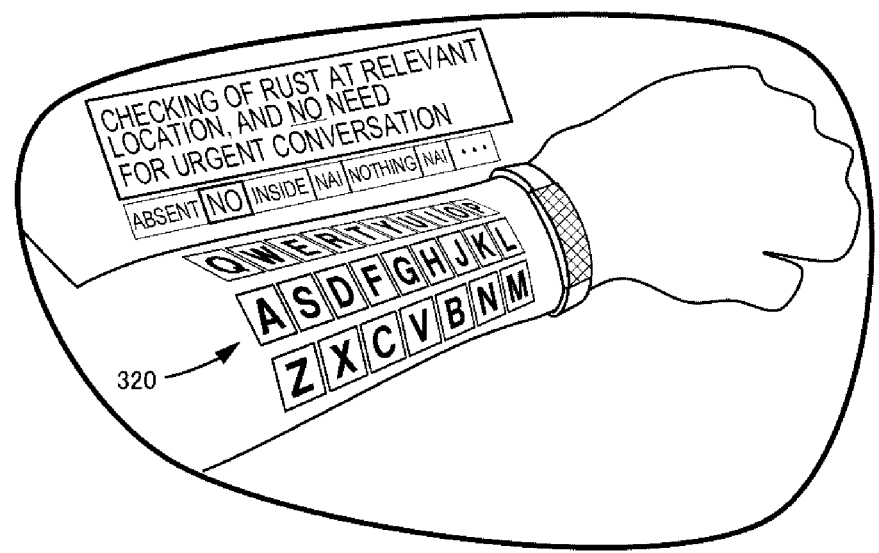
FIG. 23 is a diagram illustrating a scene after a memo button is selected.

The memo button 316 is an input operation for inputting a memo. FIG. 23 is a diagram illustrating a scene after the memo button 316 is selected. The glasses 200 display a keyboard image 320 on the display 204 such that the keyboard image 320 is viewed so as to be superimposed on the left arm 50. The user taps each key of the keyboard image 320 so as to input a memo.

In a case where the user selects the imaging button 304 from the operation selection menu 300, a captured image generated by the camera 202 when the selection is performed is stored in correlation with the current check item. For example, the user presses the imaging button 304 in a state in which a location of facility to be checked that user concerns is included in the view of the user. Then, a captured image including the location concerned by the user is recorded.

In a case where the user selects the record button 306 from the operation selection menu 300, an input operation on the current check item is finished, and transition to the next check item occurs. The user performs the above-described various input operations on the next check item. As mentioned above, the user performs input operations on each check item.

Note that, although the present example targets checking work, an application range of the input apparatus 2000 is not limited to the checking work. For example, the input apparatus 2000 may be used for instrument assembling work, nursing work of a nurse or the like, and other various pieces of work.

As mentioned above, the example embodiments of the present invention have been described with reference to the drawings, but these are only examples of the present invention, and combinations of the example embodiments and various configurations other than the example embodiments may be employed.

For example, in the description hitherto, the motion detection unit 2020 detects motion of an object from the entire captured image 22. However, the motion detection unit 2020 may detect motion of an object from a partial region of the captured image 22. In the latter case, a region in which motion of an object is detected will be referred to as a detection region.

The motion detection unit 2020 defines a detection region by using a marker included in the captured image 22. The marker is any marker at least a position of which can be determined in the captured image 22. For example, the marker is a marker which can be used for determination of a three-dimensional coordinate system. A marker used for determination of a three-dimensional coordinate system is, for example, an augmented reality (AR) marker. However, a marker used for determination of a three-dimensional coordinate system may be a marker causing three directions orthogonal to each other from a certain reference point to be obtained in a constant manner, and is not limited to the AR marker.

The marker may be attached to any location of the user's body. For example, the marker is attached to an arm portion of the user. Here, the arm portion of the user is parts including not only the arm, but the arm and the hand. For example, the marker is an image displayed on the touch panel 14 of the device 10 attached to the arm portion of the user. Hereinafter, an image of the marker displayed on the touch panel 14 will be referred to as a marker image.

The marker image may be an image stored in the device 10 in advance, or may be an image stored in an external storage device of the device 10. In the latter case, the device 10 acquires a marker image to be displayed from the storage device, and displays the marker image.

For example, it is assumed that the user moves a detection target object (for example, the user's finger) on the arm portion of the user. In this case, the user attaches a marker to the arm portion in advance. For example, in a case where the marker is the above-described marker image, and the object is moved on the left arm, the user attaches the device 10 to the left arm.

Figure 28:
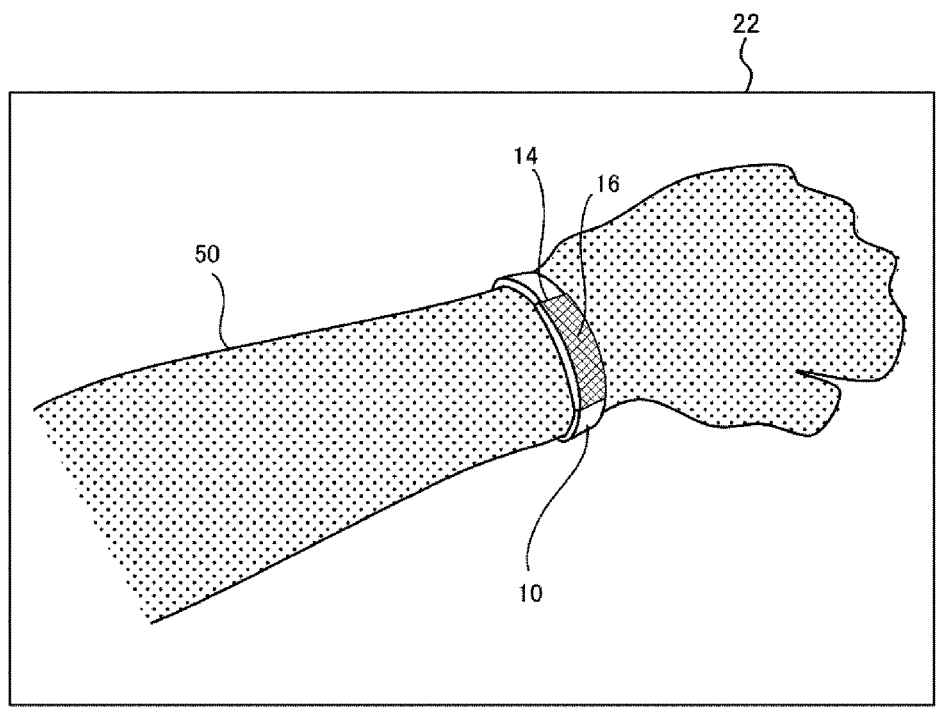
FIG. 28 is a first diagram illustrating a method of defining a detection region based on a marker.

For example, the motion detection unit 2020 detects the marker included in the captured image 22. The motion detection unit defines a region indicating the arm portion attached with the marker as a detection region. FIG. 28 is a first diagram illustrating a method of defining a detection region based on the marker. In FIG. 28, the marker is a marker image 16.

The motion detection unit 2020 detects the marker image 16 from the captured image 22. The motion detection unit 2020 further detects the left arm 50 on which the marker image 16 is superimposed, from the captured image 22. The motion detection unit 2020 handles a region shaded with a dot pattern indicating the left arm 50 as a detection region.

Here, the motion detection unit 2020 may define a part of the left arm 50 as a detection region by using the marker image 16. For example, the motion detection unit 2020 divides a region indicating the left arm 50 into two parts with the marker image as a boundary. The motion detection unit 2020 handles a wider region of the two separate regions as a detection region.

Figure 29:
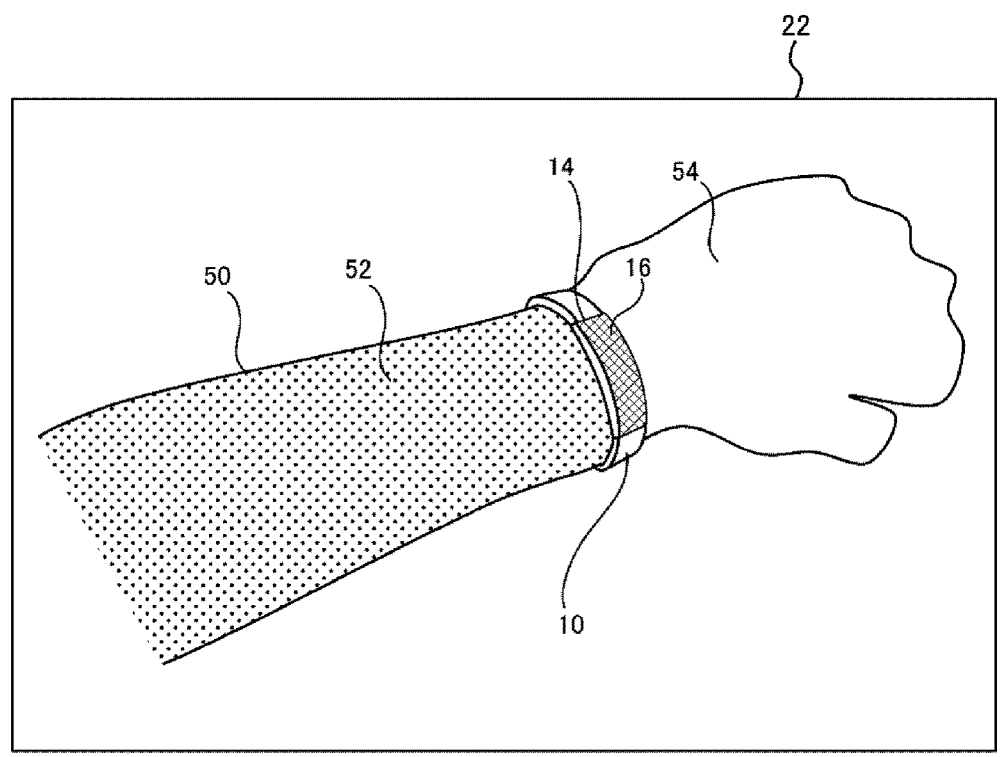
FIG. 29 is a second diagram illustrating a method of defining a detection region based on a marker.

FIG. 29 is a second diagram illustrating a method of defining a detection region based on the marker. In FIG. 29, a region indicating the left arm 50 is assumed to be divided into a region 52 and a region 54 with the marker image 16 as a boundary. The region 52 is wider than the region 54. Therefore, the motion detection unit 2020 handles the region 52 as a detection region.

In a case where a part of the arm portion is defined as a detection region, the motion detection unit 2020 may define a detection region based on whether a marker is attached to the left arm portion or the right arm portion. In this case, information indicating the arm portion to which the marker is attached is assumed to be defined in advance. The information may be set in the motion detection unit 2020 in advance, or may be stored in a storage device which can be accessed from the motion detection unit 2020.

For example, in a case where the marker is attached to the left arm portion, the motion detection unit 2020 handles a left region of a position of the marker as a detection region in the region indicating the left arm portion. On the other hand, in a case where the marker is attached to the right arm portion, the motion detection unit 2020 handles a right region of a position of the marker as a detection region in the region indicating the right arm.

Figure 30:
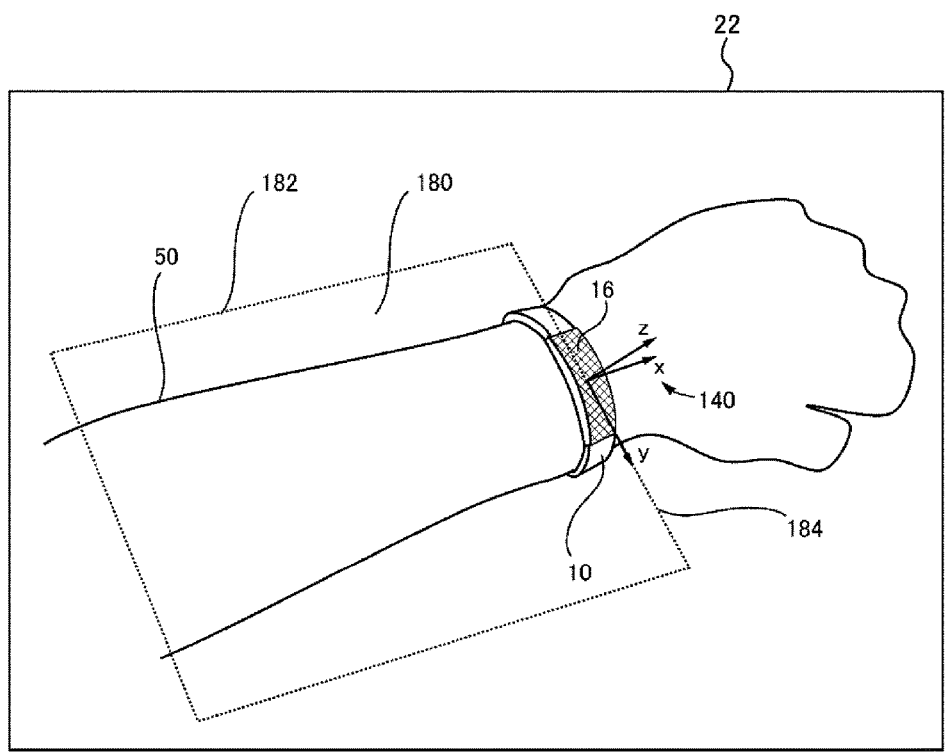
FIG. 30 is a third diagram illustrating a method of defining a detection region based on a marker.

FIG. 30 is a third diagram illustrating a method of defining a detection region based on the marker. First, the motion detection unit 2020 detects the marker image 16 from the captured image 22. Next, the motion detection unit 2020 calculates the coordinate axes 140.

In the case illustrated in FIG. 30, the marker image 16 is present on the left arm 50. Therefore, the motion detection unit 2020 handles s a left region of the position of the marker image 16 as a detection region. Specifically, the motion detection unit 2020 defines, as a detection region, a region that is an xy plane in a coordinate system defined by the coordinate axes 140 and the position in the y direction of which is a position in a negative direction with the origin of the coordinate axes 140 as a reference. In FIG. 30, a detection region 180 is the detection region.

In the detection region 180, a length of a side 182 which is a side in the x direction or a length of a side 184 which is a side in the y direction is, for example, a predetermined length set in advance. However, the motion detection unit 2020 may gradually decrease a size of the detection region 180 by reducing the length of the side 182 or the side 184. Specifically, the motion detection unit 2020 narrows the detection region 180 in a case where an object is not detected for a predetermined period or more in a region far away from the center among regions included in the detection region 180. For example, it is assumed that an object is not detected for a predetermined period in a region that becomes not included in the detection region 180 2 5 when the side 184 is reduced by a predetermined length, among regions in the detection region 180. In this case, the motion detection unit 2020 reduces the side 184 by the predetermined length. Since there is an individual difference in a size or a thickness of the arm, the motion detection unit 2020 gradually reduces the detection region 180, and thus handles such an individual difference. Note that each of the predetermined values may be set in the motion detection unit 2020 in advance, or may be stored in a storage device which can be accessed from the motion detection unit 2020.

As mentioned above, a range in which motion of an object is detected is restricted with a marker as a reference, and thus it is possible to reduce an amount of computation required to detect motion of the object. Thus, the time required to detect motion of the object is reduced. According to the method of defining a detection region with a marker as a reference, it is possible to define a detection region according to a simple method.

As in the examples illustrated in FIGS. 28 to 30, if a location where an object is moved is restricted to the upper part of the arm portion, the background of a detection region is the user's bare skin or a sleeve of clothes. Thus, a color or a pattern of the background is simpler than in a case where general scenery is the background. Therefore, detection of an object is facilitated.

Hereinafter, examples of reference embodiments are added.

1. An input apparatus comprising:
a motion detection unit detecting motion of an object in a period defined based on a result of detection by a sensor attached to a body of a user, by using a captured image including the object; and
an input recognition unit recognizing input to an information processing apparatus based on the detected motion of the object.

2. The input apparatus according to 1, wherein the motion detection unit determines at least one of a start point and an end point of motion of the object to be detected by using a detection timing of the sensor.

3. The input apparatus according to 1. or 2, wherein the sensor is a vibration sensor, an acceleration sensor, a vibration switch, a pressure sensor, or an electrostatic capacitance sensor.

4. The input apparatus according to any one of 1. to 3, wherein the object is a part of the body of the user or a device provided with the sensor.

5. The input apparatus according to any one of 1. to 4, wherein the input recognition unit recognizes input drawing a first region based on motion of the object, and wherein the input apparatus further includes:
a display control unit displaying a second region defined based on the first region on a display screen; and
an extraction unit extracting a partial image included in a range corresponding to the second region from a captured image.

6. The input apparatus according to 5,
wherein the display control unit displays the second region on the display screen so as to be superimposed on the captured image, and
wherein the extraction unit extracts the partial image from a range the second region being superimposed on the captured image displayed on the display screen.

7. The input apparatus according to any one of 1. to 6, wherein the motion detection unit detects a marker included in the captured image, defines a partial region of the captured image based on the marker, and detects motion of the object in the partial region of the captured image.

8. An input method executed by a computer, the method including
a motion detection step of detecting motion of an object in a period defined based on a result of detection by a sensor attached to a body of a user, by using a captured image including the object; and
an input recognition step of recognizing input to an information processing apparatus based on the detected motion of the object.

9. The input method according to 8., wherein in the motion detection step, at least one of a start point and an end point of motion of the object to be detected is determined by using a detection timing of the sensor.

10. The input method according to 8. or 9, wherein the sensor is a vibration sensor, an acceleration sensor, a vibration switch, a pressure sensor, or an electrostatic capacitance sensor.

11. The input method according to any one of 8. to 10, wherein the object is a part of the body of the user or a device provided with the sensor.

12. The input method according to any one of 8. to 11, wherein in the input recognition step, recognizing input drawing a first region based on motion of the object, and
wherein the input method further includes:
a display control step of displaying a second region defined based on the first region on a display screen; and
an extraction step of extracting a partial image included in a range corresponding to the second region from a captured image.

13. The input method according to 12.
wherein in the display control step, displaying the second region on the display screen so as to be superimposed on the captured image, and
wherein in the extraction step, extracting the partial image from a range the second region being superimposed on the captured image displayed on the display screen.

14. The input method according to any one of 8. to 13, wherein in the motion detection step, detecting a marker included in the captured image, defining a partial region of the captured image based on the marker, and detecting motion of the object in the partial region of the captured image.

15. A program causing a computer to execute each step in the input method according to any one of 8. to 14.

This application is based upon and claims the benefit of priority from Japanese Patent Application No. 2015-190238, filed Sep. 28, 2015; the entire contents of which are incorporated herein by reference.

The invention claimed is:

1. An input apparatus comprising:
a memory storing instructions; and
a processor configured to execute the instructions to:
detect motion of an object by using a captured image, that includes the object, in a period defined based on a result of detection of a touch to a body of a user by a sensor attached to the body of the user; and
recognize input to an information processing apparatus based on the detected motion of the object,
wherein the processor is further configured to detect a marker from the captured image, define a partial region of the captured image based on the marker, and detect motion of the object in the partial region of the captured image,
wherein the marker is a predetermined image displayed on a display device of a device attached to the body of the user.

2. The input apparatus according to claim 1, wherein the sensor is a vibration sensor, an acceleration sensor, a vibration switch, a pressure sensor, or an electrostatic capacitance sensor.

3. The input apparatus according to claim 1, wherein the processor is further configured to detect the touch to the body of the user by detecting a vibration being applied to the body of the user using the sensor.

4. The input apparatus according to claim 1, wherein the processor is further configured to determine at least one of a start point and an end point of motion of the object to be detected by using a detection timing of the sensor.

5. The input apparatus according to claim 1, wherein the object is a part of the body of the user or a device provided with the sensor.

6. The input apparatus according to claim 1, wherein the processor is further configured to recognize input drawing a first region based on motion of the object, and
wherein the processor is further configured to:
display on a display screen a second region defined based on the first region; and
extract a partial image included in a range corresponding to the second region from a captured image.

7. The input apparatus according to claim 6,
wherein the processor is further configured to: display the second region on the display screen so as to be superimposed on the captured image; and
extract the partial image from a range the second region being superimposed on the captured image displayed on the display screen.

8. The input apparatus according to claim 1, wherein the processor is further configured to:
convert position of the object in the captured image into a coordinate in a coordinate system determined based on the marker, and
detect changed in the position of the object in the coordinate system as the motion of the object.

9. An input method executed by a computer, the method comprising:
detecting motion of an object by using a captured image, that includes the object, in a period defined based on a result of detection of a touch to a body of a user by a sensor attached to the body of the user; and
recognizing input to an information processing apparatus based on the detected motion of the object,
wherein the method further comprises detecting a marker from the captured image, defining a partial region of the captured image based on the marker, and detecting motion of the object in the partial region of the captured image, wherein the marker is a predetermined image displayed on a display device of a device attached to the body of the user.

10. A non-transitory computer-readable storage medium storing a program causing a computer to execute each step in the input method according to claim 9.

* * * * *